(12) United States Patent
Dohta

(10) Patent No.: US 7,690,994 B2
(45) Date of Patent: Apr. 6, 2010

(54) STORAGE MEDIUM STORING VIRTUAL POSITION DETERMINING PROGRAM

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1003 days.

(21) Appl. No.: 11/429,263

(22) Filed: May 8, 2006

(65) Prior Publication Data
US 2007/0060385 A1 Mar. 15, 2007

(30) Foreign Application Priority Data
Sep. 14, 2005 (JP) .............................. 2005-267717

(51) Int. Cl.
G09G 5/00 (2006.01)
A63F 9/22 (2006.01)

(52) U.S. Cl. .............................. 463/37; 463/38; 463/39; 345/156; 345/161; 345/179

(58) Field of Classification Search ................. 345/156, 345/157, 158, 161, 162, 179; 463/31, 36–39
See application file for complete search history.

(56) References Cited

U.S. PATENT DOCUMENTS

| 5,009,501 A | 4/1991 | Fenner et al. |
| 5,864,636 A | 1/1999 | Chisaka |
| 5,898,421 A | 4/1999 | Quinn |
| 5,913,727 A * | 6/1999 | Ahdoot .......................... 463/39 |
| 5,999,185 A * | 12/1999 | Kato et al. .................... 345/420 |
| 6,067,077 A * | 5/2000 | Martin et al. ................ 345/161 |
| 2004/0218104 A1 | 11/2004 | Smith et al. |
| 2006/0209019 A1 * | 9/2006 | Hu .............................. 345/156 |

FOREIGN PATENT DOCUMENTS

| EP | 1 222 949 | 7/2002 |
| JP | 8-185479 | 7/1996 |
| JP | 10-222293 | 8/1998 |
| JP | 11-305935 | 11/1999 |
| WO | WO 2004/036244 | 4/2004 |

OTHER PUBLICATIONS

"Power Glove", from Wikipedia, http://en.wikipedia.org/wiki/Power_Glove, retrieved on Aug. 2, 2006, 6 pages.

* cited by examiner

*Primary Examiner*—James S McClellan
*Assistant Examiner*—Lawrence Galka
(74) *Attorney, Agent, or Firm*—Nixon & Vanderhye P.C.

(57) ABSTRACT

A game controller includes an image-capturing section, and outputs, as control data, a captured image itself or a result of performing a predetermined operation on the captured image. Using the control data obtained from the game controller, distance data regarding the distance between the game controller and the imaging target is calculated. A predetermined game process is performed on a virtual game world based on the calculated distance data. Then, the virtual game world after the game process is displayed as an image on a display device.

9 Claims, 24 Drawing Sheets

F I G. 6
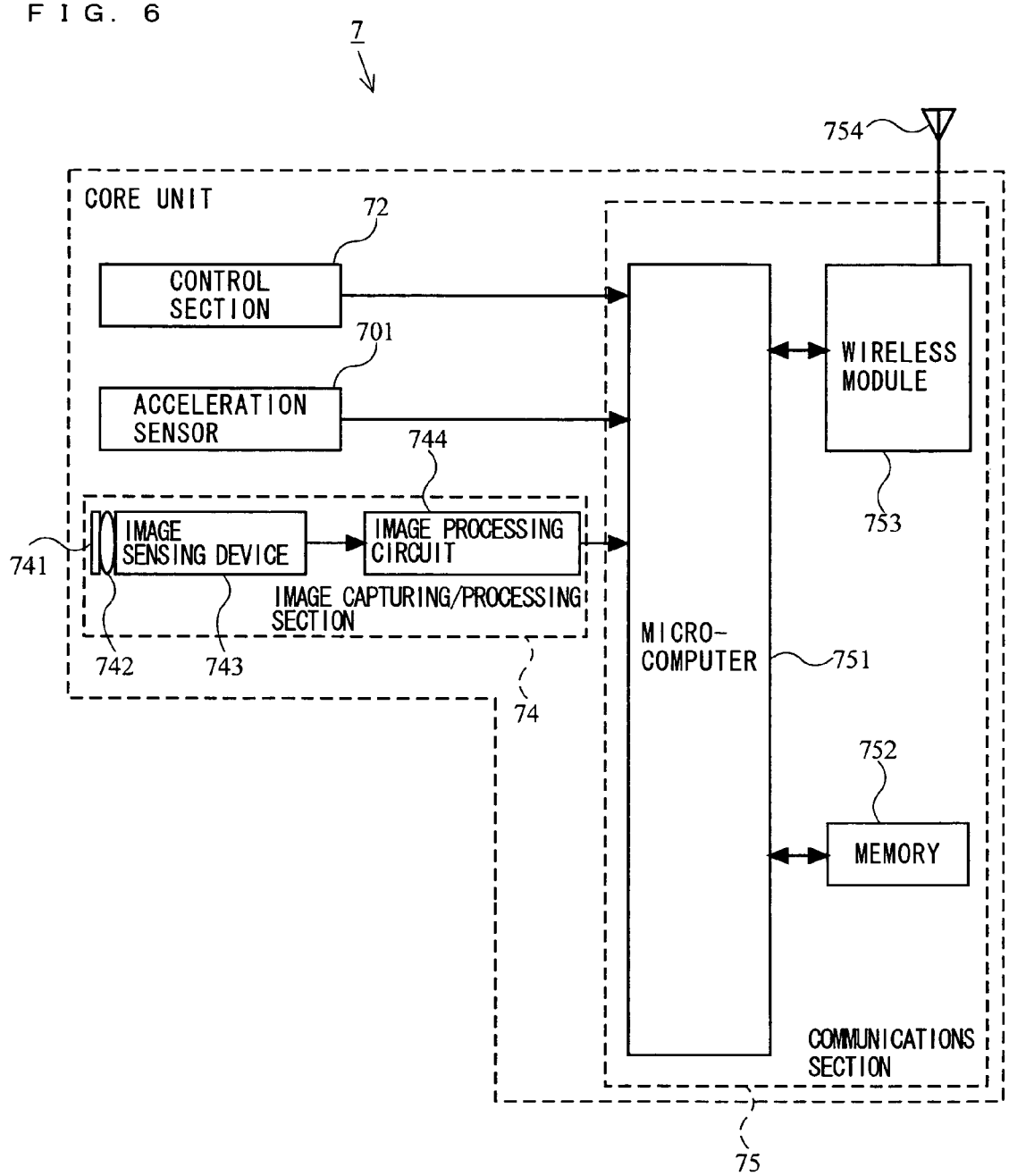

F I G. 9
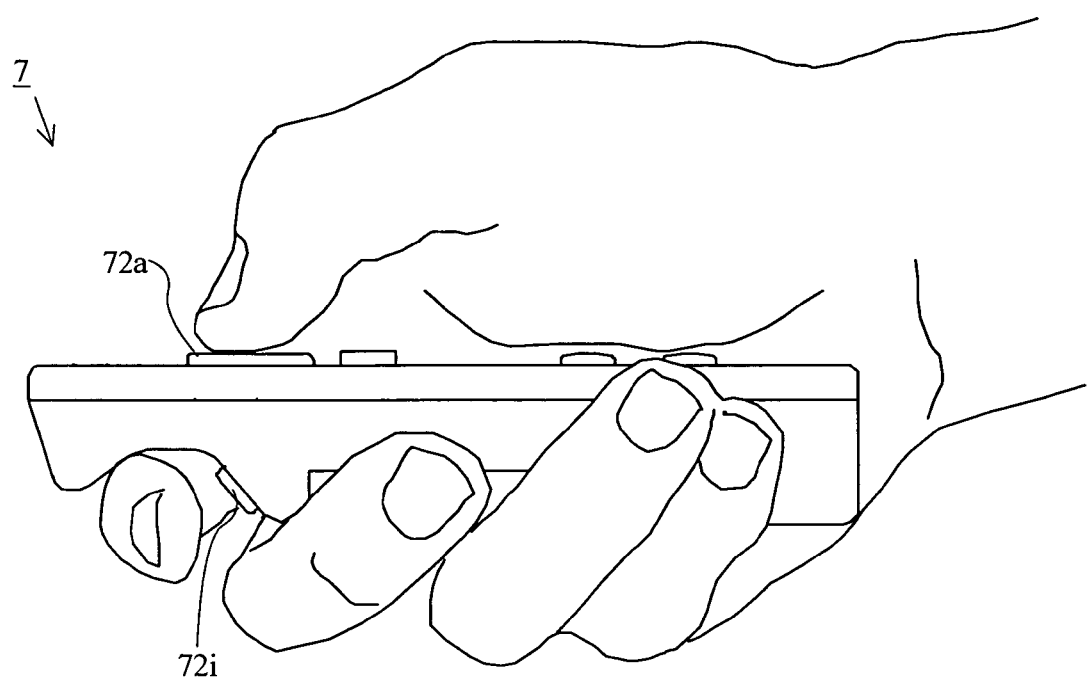

F I G. 2 1
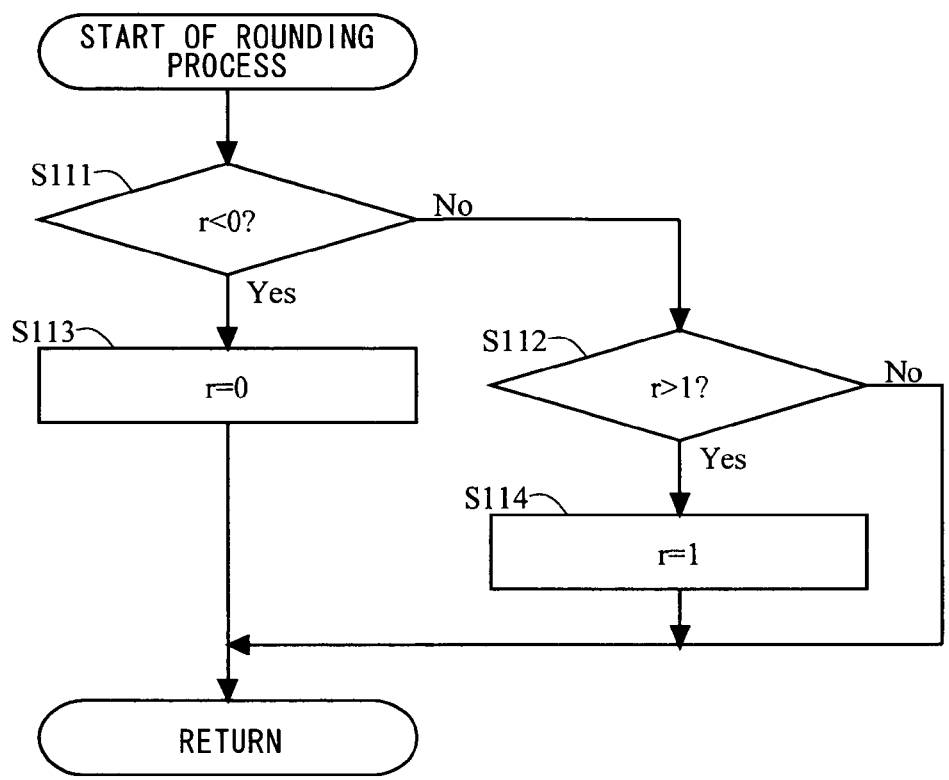

STORAGE MEDIUM STORING VIRTUAL POSITION DETERMINING PROGRAM

CROSS REFERENCE TO RELATED APPLICATION

This application claims foreign priority of Japanese Patent Application No. 2005-267717, filed on Sep. 14, 2005, which is incorporated herein by reference.

BACKGROUND

1. Field of the Invention

The present invention technology presented herein relates to a storage medium storing a virtual position determining program and, more particularly, to a storage medium storing a virtual position determining program for calculating the position of a virtual object in a virtual space based on the position of a target in the real space.

2. Description of the Background Art

In the prior art, Japanese Laid-Open Patent Publication No. 11-305935 (hereinafter "Patent Document 1"), for example, discloses a position detection system for taking an image of an infrared light source and analyzing the obtained image to determine a gunsight position.

As an example of a position detection system, Patent Document 1 discloses a shooter video game in which the player shoots targets by using, as a game controller, a gun-shaped controller provided with an image capturing device. Four infrared light sources are provided, as imaging targets, each at a corner of a cathode-ray tube, and an image thereof is taken by the image capturing device. The position on the cathode-ray tube being pointed at by the gun-shaped controller is detected based on the positions of the imaging targets on the obtained image. A virtual shooter game is played by using the position being pointed at by the gun-shaped controller as the gunsight position. As stated in Paragraph 21 of Patent Document 1, in a case where the distance between the image capturing device and the target (marker) can be changed freely, the gunsight position can be detected accurately if the image capturing device has a controllable zoom function and if the zoom function is controlled so that the marker on the obtained image always has an optimal size.

However, there is no such concept in the prior art that the position of the game controller, being an example of an input device, in the real space is used as a control input. In the position detection system disclosed in Patent Document 1, the position on the cathode-ray tube being pointed at by the gun-shaped controller is used as an input, but the pointed position only represents a position on the screen, not the position of the controller in the real space. While the distance between the image capturing device and the marker in the real space can be obtained, the distance is only used for making corrections. In other words, the distance is a sort of a value representing the position of the controller in the real space, but it is not used as a control input.

If the distance between the game controller and the imaging target is used as a control input, the range over which the player can move the game controller in the distance direction will be quite large. Therefore, the input range and the input variation will be significant, and it is difficult in the prior art to appropriately associate such a value with significant variations with the position of the controlled object in the virtual space. Moreover, where the player makes the control input vary depending on the situation, thereby varying the distance value, it is difficult to associate it with an appropriate virtual position. It is clear that similar problems will occur not only with the distance, which is a one-dimensional value, but also when detecting a three-dimensional position in the real space. With those problems as set forth above, there is no such concept in conventional control input methods that the position of the controller in the real space is used directly as a control input.

SUMMARY

Therefore, a feature of an example embodiment presented herein is to provide a storage medium storing a virtual position determining program, which realizes a novel control operation with a high degree of freedom while using the position of a target in the real space.

The example embodiment has the following features to attain the objects mentioned above.

A first aspect of the example embodiment is directed to a storage medium storing a virtual position determining program for instructing a computer (30) to perform a process on a virtual space based on input information (Da) obtained from an input device (7), the input information including target data (Da1, Da2) that changes according to a change in a position of a predetermined target in a real space, the program instructing the computer to perform: an actual position data calculation step (S52) of calculating actual position data (Db3) representing a position of the target in the real space by using the target data; an effective range defining step (S63, S66) of defining an effective range as a range extending from a first boundary to a second boundary, wherein the first boundary is represented by first position data and the second boundary is represented by second position data; an effective range position data calculation step (S95, S105, S130) of calculating effective range position data representing a position of a value of the actual position data in the effective range; a position determining step (S67, S54) of determining a position of a controlled object in the virtual space through an operation based on a value of the effective range position data; and a display process step (S56) of displaying the virtual space on a display device (2).

According to a second aspect, the virtual position determining program instructs the computer to further perform an effective range updating step (S91 to S94, S101 to S104, S121 to S129) of, when the value of the actual position data is outside the effective range, updating the effective range by moving the first boundary and the second boundary so that the value of the actual position data is included in the effective range.

According to a third aspect, the virtual position determining program instructs the computer to further perform an effective range updating step (S91 to S94) of, when the value of the actual position data is outside the effective range, updating the effective range by moving the first boundary and the second boundary so that one of the first boundary and the second boundary that is closer to the value of the actual position data becomes equal to the value of the actual position data.

According to a fourth aspect, the virtual position determining program instructs the computer to further perform a second effective range updating step (S121 to S129) of, when the value of the actual position data is outside the effective range, updating the effective range by moving the first boundary and the second boundary so that one of the first boundary and the second boundary that is closer to the value of the actual position data approaches the value of the actual position data at a predetermined rate.

According to a fifth aspect, the effective range position data calculation step calculates the effective range position data so that the effective range position data takes a maximum value when the value of the actual position data is equal to the first boundary and the effective range position data takes a minimum value when the value of the actual position data is equal to the second boundary.

According to a sixth aspect, the effective range defining step includes a step of further defining a play range having a predetermined length at a front end of the effective range and a rear end thereof and the virtual position determining program instructs the computer to further perform an effective range updating step (S101 to S104) of, when the actual position data takes a value outside a combined range including the effective range and the play ranges, updating the effective range by moving the values of the first boundary and the second boundary so that one of the first boundary and the second boundary that is closer to the value of the actual position data becomes equal to the value of the actual position data.

According to a seventh aspect, the effective range position data calculation step includes a step (S106) of calculating the effective range position data so that the effective range position data takes a maximum value when the value of the actual position data is equal to the first position data or exceeds the effective range in a direction of the first position data, and the effective range position data takes a minimum value when the value of the actual position data is equal to the second position data or exceeds the effective range in a direction of the second position data.

According to an eighth aspect, the effective range defining step defines the second position data on a first side of the first position data, third position data on a second side of the first position data, and fourth position data on the first side of the second position data; and the effective range defining step defines an upper limit boundary as position data variable from the first position data to the third position data and a lower limit boundary as position data variable from the second position data to the fourth position data, and defining the effective range as a range between the variable upper limit boundary and the variable lower limit boundary; and the virtual position determining program instructs the computer to further perform: a step of, when the value of the actual position data is within the variable range of the upper limit boundary/lower limit boundary, updating the upper limit boundary/lower limit boundary so that the upper limit boundary/lower limit boundary approaches the value of the actual position data at a predetermined rate, and updating the lower limit boundary/upper limit boundary so that the lower limit boundary/upper limit boundary approaches the second position data/first position data at a predetermined rate; a step of, when the value of the actual position data is within a range between the first position data and the second position data, updating the upper limit boundary/lower limit boundary so that the upper limit boundary/lower limit boundary approaches the first position data/second position data at a predetermined rate; a step of, when the value of the actual position data is further on the second side of the third position data, moving the first position data, the second position data, the third position data, the fourth position data and the lower limit boundary so that a value of the third position data approaches the value of the actual position data at a predetermined rate and updating the upper limit boundary to the new third position data; and a step of, when the value of the actual position data is further on the first side of the fourth position data, moving the first position data, the second position data, the third position data, the fourth position data and the upper limit boundary so that a value of the fourth position data approaches the value of the actual position data at a predetermined rate and updating the lower limit boundary to the new fourth position data (S121 to S129).

According to a ninth aspect, the effective range position data calculation step includes a step (S106) of calculating the effective range position data so that the effective range position data takes a maximum value when the value of the actual position data is equal to the first position data or exceeds the effective range in a direction of the first position data, and the effective range position data takes a minimum value when the value of the actual position data is equal to the second position data or exceeds the effective range in a direction of the second position data.

A tenth aspect of the example embodiment is directed to a storage medium storing a virtual position determining program for, based on data (Da) from an input device (7) including position information of a target in a real space, calculating a position of the target obtained when representing the real space in a predetermined coordinate system, and calculating a virtual position of a virtual object in a virtual space based on the calculated position, the virtual position determining program instructs a computer (30) to function as: effective range defining means (S63, S66) for defining an effective range, which is defined by at least a first position and a second position in a predetermined coordinate system of the real space; normalization means (S95, S105, S130) for, when the position of the target is included in the effective range, normalizing the effective range and calculating a value corresponding to the position of the target obtained when the normalization is performed; and calculation means (S67, S54) for calculating the virtual position based on the value calculated by the normalization means.

According to an eleventh aspect, the virtual position determining program instructs the computer to further function as effective range moving means (S91 to S94, S101 to S104, S121 to S129) for, when the position of the target is not included in the effective range, updating the first position and the second position to move the effective range to a position that includes the position of the target.

According to the first aspect, an effective range of the position data is defined, effective range position data representing the position of the value of the actual position data in the effective range is calculated, and the position of the controlled object in the virtual space is determined through an operation based on the effective range position data. Therefore, it is possible to realize a virtual position determining process with a novel operation feel for determining a virtual position based on the position of the target in the real space.

According to the second aspect, the boundary is moved when the value of the actual position data is outside the effective range, whereby it is possible to freely define the range of motion of the target, thus increasing the degree of freedom.

According to the third aspect, the boundary is moved when the value of the actual position data is outside the effective range, whereby it is possible to freely define the range of motion of the target, thus increasing the degree of freedom.

According to the fourth aspect, the boundary is moved when the value of the actual position data is outside the effective range, whereby it is possible to freely define the range of motion of the target, thus increasing the degree of freedom.

According to the fifth aspect, the effective range position data takes the maximum value when the value of the actual position data is equal to the first boundary and the effective range position data takes the minimum value when the value of the actual position data is equal to the second boundary.

Therefore, it is possible to intuitively control the position of the controlled object in the virtual space according to the position of the target.

According to the sixth aspect, the play range is provided at the front end and the rear end of the effective range, whereby it is possible to reduce the influence of an abrupt movement beyond the effective range due to an erroneous operation, or the like.

According to the eighth aspect, since the boundary is moved, it is possible to freely define the range of motion of the target. Moreover, the effective range is moved gradually. Therefore, it is possible to reduce the influence of an abrupt movement beyond the effective range due to an erroneous operation, or the like.

According to the seventh or ninth aspect, the effective range position data takes the maximum value when the value of the actual position data is equal to the first position data or exceeds the effective range in the direction of the first position data, and the effective range position data takes the minimum value when the value of the actual position data is equal to the second position data or exceeds the effective range in the direction of the second position data. Therefore, it is possible to reduce the influence of an abrupt movement beyond the effective range due to an erroneous operation, or the like, and to intuitively control the position of the controlled object in the virtual space according to the position of the target.

According to the tenth aspect, an effective range of the position is defined, and the virtual position is determined through an operation based on a value corresponding to the position of the target obtained when the effective range is normalized. Therefore, it is possible to realize a virtual position determining process with a novel operation feel for determining a virtual position based on the position of the target in the real space, and to intuitively control the position of the controlled object in the virtual space according to the position of the target.

According to the eleventh aspect, the effective range is moved when the position is outside the effective range, whereby it is possible to freely define the range of motion of the target, thus increasing the degree of freedom.

These and other features, aspects and advantages of the example embodiment presented herein will become more apparent from the following detailed description of the example embodiment when taken in conjunction with the accompanying drawings.

BRIEF DESCRIPTION OF THE DRAWINGS

FIG. 5A is a perspective view showing the controller 7 of FIG. 3 with an upper casing taken off;

FIG. 5B is a perspective view showing the controller 7 of FIG. 3 with a lower casing taken off;

FIG. 6 is a block diagram showing a configuration of the controller 7 of FIG. 3;

FIG. 9 shows the controller 7 being held in the player's right hand, as viewed from the left side;

FIG. 21 shows, in detail, a subroutine of step 106 in FIG. 20 for the rounding process;

DESCRIPTION OF THE PREFERRED EMBODIMENTS

First Embodiment

Figure 1:
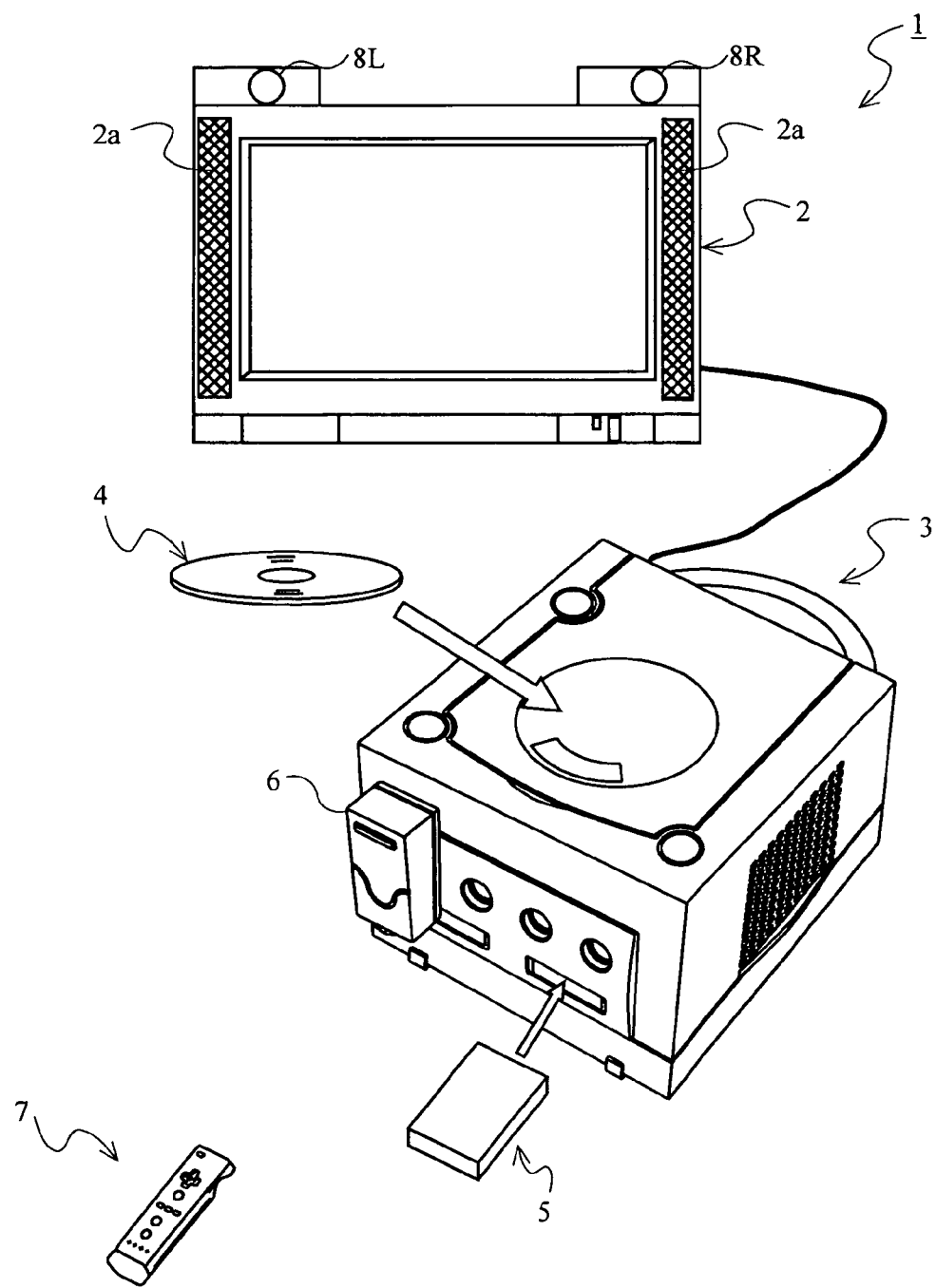
FIG. 1 shows an external view of a video game system 1 in one embodiment.

Referring to FIG. 1, a video game system 1 for executing a virtual position determining program according to a first embodiment will now be described. FIG. 1 shows an external view of the video game system 1. In the present embodiment, the video game system 1 includes a home-console type video game device.

Referring to FIG. 1, the video game system 1 includes a home-console type video game device (hereinafter simply "video game device") 3 and a controller 7 for giving control information to the video game device 3. The video game device 3 is connected, via a connection cord, to a display (hereinafter "monitor") 2 provided with a speaker 2a, such as a home television receiver. A receiver unit 6 is connected to the video game device 3 via a connection terminal. The receiver unit 6 receives transmit data wirelessly transmitted from the controller 7, and the controller 7 and the video game device 3 are connected via wireless communications. The video game device 3 uses an optical disk 4, being an example of an information storage medium, that can be received by the video game device 3. Provided on the upper principal plane of the video game device 3 are an ON/OFF switch for turning ON/OFF the power of the video game device 3, a reset switch for resetting a game process, and an OPEN switch for opening the upper lid of the video game device 3. The lid opens up when the OPEN switch is pressed by the player so that the optical disk 4 can be put in place.

The video game device 3 can also receive an external memory card 5 including a backup memory, or the like, for statically storing save data, or the like. The video game device 3 executes a video game program, or the like, stored in the optical disk 4 to obtain a game image, and displays the obtained game image on the monitor 2. The video game device 3 may reproduce a past game status from save data stored in the external memory card 5 to obtain a game image for that past game status, and display the obtained game image on the monitor 2. Then, the player of the video game device 3 can enjoy the game process by operating the controller 7 while watching the game image displayed on the monitor 2.

The controller 7 wirelessly transmits, from a communications section 75 (to be described later) therein, transmit data to the video game device 3, to which the receiver unit 6 is connected, by means of a technique such as Bluetooth (registered trademark), for example. The controller 7 is means for controlling a player object in a game space displayed on the monitor 2. The controller 7 has a control section, including a plurality of control buttons, keys, sticks, etc. As will be more apparent from the following description, the controller 7 includes an image capturing/processing section 74 for capturing an image as viewed from the controller 7. As an example of imaging targets to be captured by the image capturing/processing section 74, two LED modules (hereinafter "markers") 8L and 8R are provided around the display screen of the monitor 2. The markers 8L and 8R output infrared light to the front side of the monitor 2.

Figure 2:
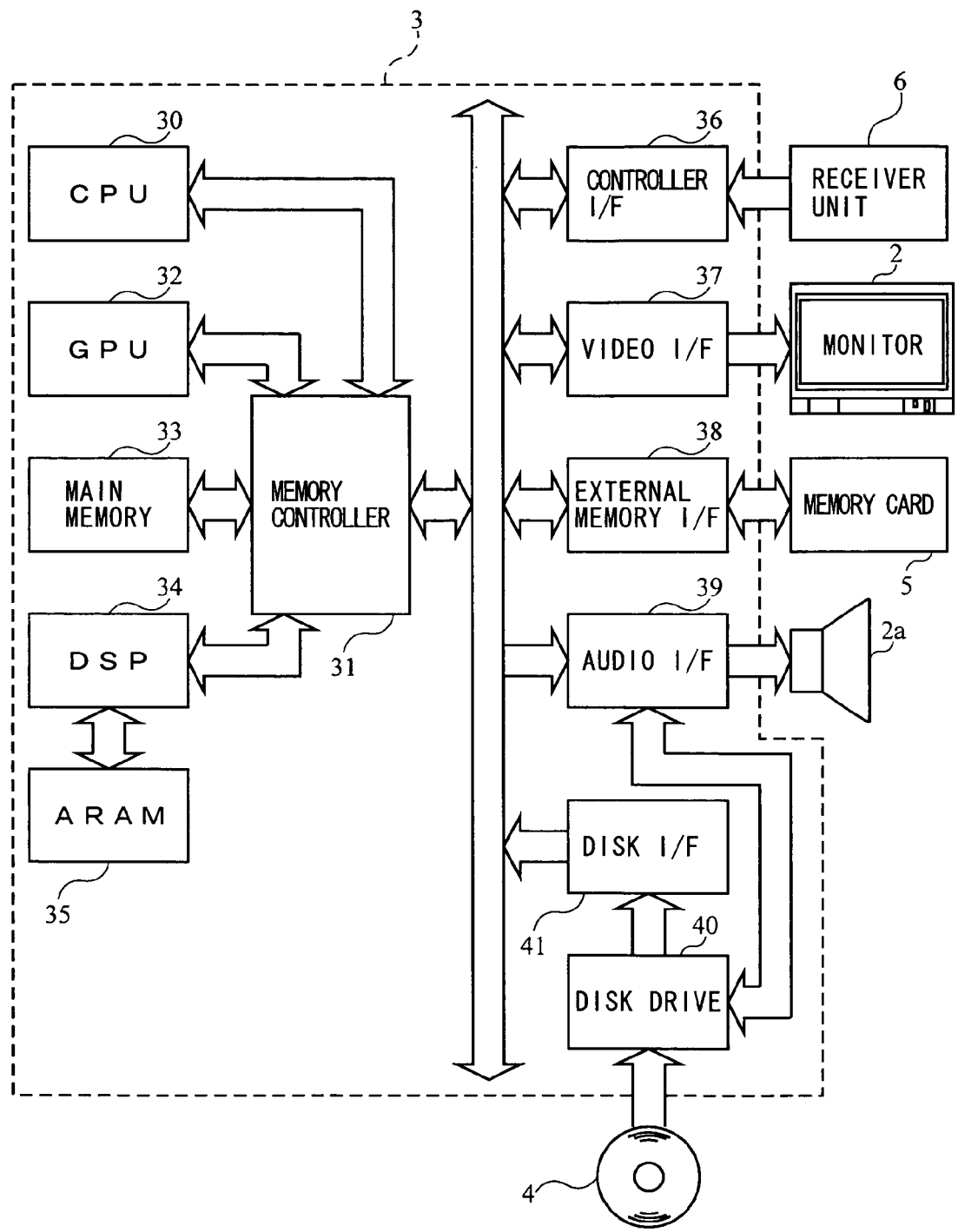
FIG. 2 is a functional block diagram showing a video game device 3 of FIG. 1.

Referring now to FIG. 2, a configuration of the video game device 3 will be described. FIG. 2 is a functional block diagram showing the video game device 3.

Referring to FIG. 2, the video game device 3 includes a RISC CPU (Central Processing Unit) 30, for example, for executing various programs. The CPU 30 executes a boot program stored in a boot ROM (not shown), thus initializing memory devices, such as a main memory 33, and then executes a video game program stored in the optical disk 4 to perform a game process, etc., according to the video game program. Connected to the CPU 30 via a memory controller 31 are a GPU (Graphics Processing Unit) 32, the main memory 33, a DSP (Digital Signal Processor) 34, and an ARAM (Audio RAM) 35. The memory controller 31 is connected, via a predetermined bus, to a controller I/F (interface) 36, a video I/F 37, an external memory I/F 38, an audio I/F 39 and a disk I/F 41, which are connected to the receiver unit 6, the monitor 2, the external memory card 5, the speaker 2a and a disk drive 40, respectively.

The GPU 32 is responsible for image processing based on instructions from the CPU 30, and is a semiconductor chip, for example, capable of computations necessary for 3D graphics display. The GPU 32 performs the image process by using a memory dedicated for image processing (not shown) or a part of the memory area of the main memory 33. The GPU 32 produces game image data or movie data to be displayed on the monitor 2 using these memory areas, and outputs the produced data to the monitor 2 via the memory controller 31 and the video I/F 37 as necessary.

The main memory 33 is a memory area used by the CPU 30, and stores a video game program, etc., as necessary for processes performed by the CPU 30. For example, the main memory 33 stores the video game program loaded from the optical disk 4 by the CPU 30 and various data, etc. The video game program, the various data, etc., stored in the main memory 33 are executed or processed by the CPU 30.

The DSP 34 is for processing sound data, etc., produced by the CPU 30 when executing the video game program, and is connected to the ARAM 35 for storing the sound data, etc. The ARAM 35 is used when the DSP 34 performs a predetermined process (e.g., storing a video game program, sound data, etc., which have been loaded in advance). The DSP 34 reads out the sound data stored in the ARAM 35, and outputs the sound data through the speaker 2a provided in the monitor 2 via the memory controller 31 and the audio I/F 39.

The memory controller 31 is responsible for the overall control of data transfers, and is connected to the various I/F's described above. The controller I/F 36 includes, for example, four controller I/F portions 36a to 36d, each having a connector into which an external unit can be fitted for communicable connection between the external unit and the video game device 3. For example, the receiver unit 6 may be fitted into the connector to be connected to the video game device 3 via the controller I/F 36. As described above, the receiver unit 6 receives transmit data from the controller 7, and outputs the transmit data to the CPU 30 via the controller I/F 36. The monitor 2 is connected to the video I/F 37. The external memory card 5 is connected to the external memory I/F 38, whereby a backup memory, etc., provided in the external memory card 5 can be accessed. The audio I/F 39 is connected to the speaker 2a provided in the monitor 2 so that the sound data read out from the ARAM 35 by the DSP 34 or the sound data outputted directly from the disk drive 40 can be outputted through the speaker 2a. The disk I/F 41 is connected to the disk drive 40. The disk drive 40 reads out data from the optical disk 4 placed in a predetermined read-out position, and outputs the data to the bus or the audio I/F 39 of the video game device 3.

Figure 3:
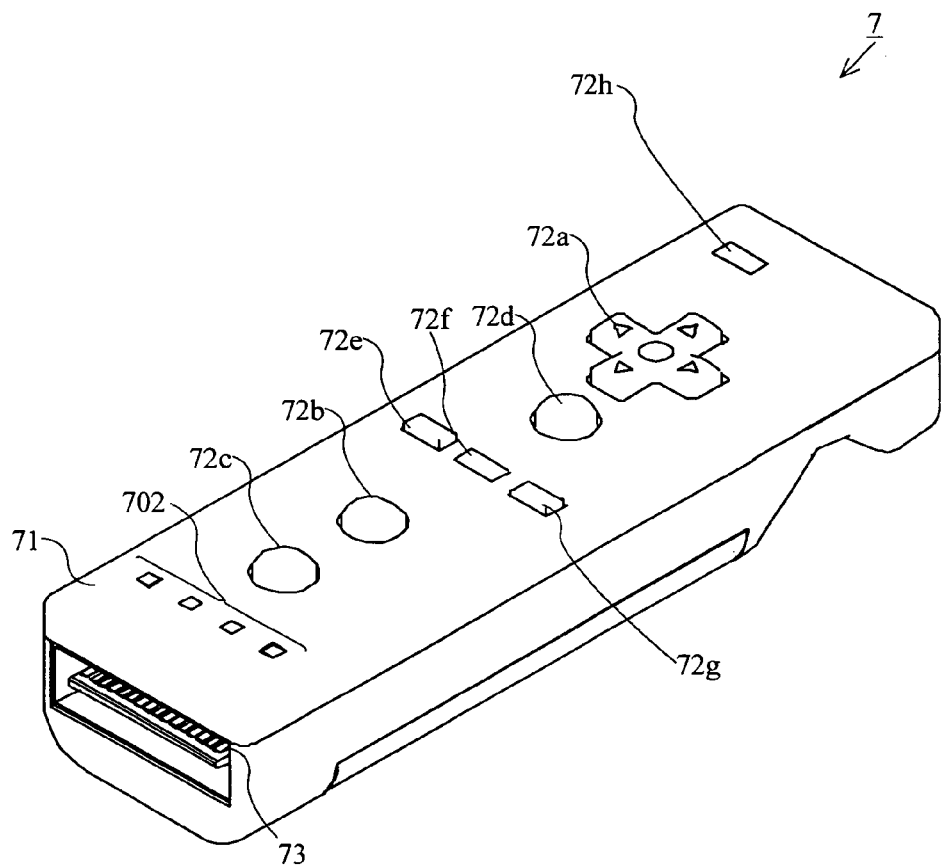
FIG. 3 is a perspective view showing a controller 7 of FIG. 1 as viewed from the upper rear side.
Figure 4:
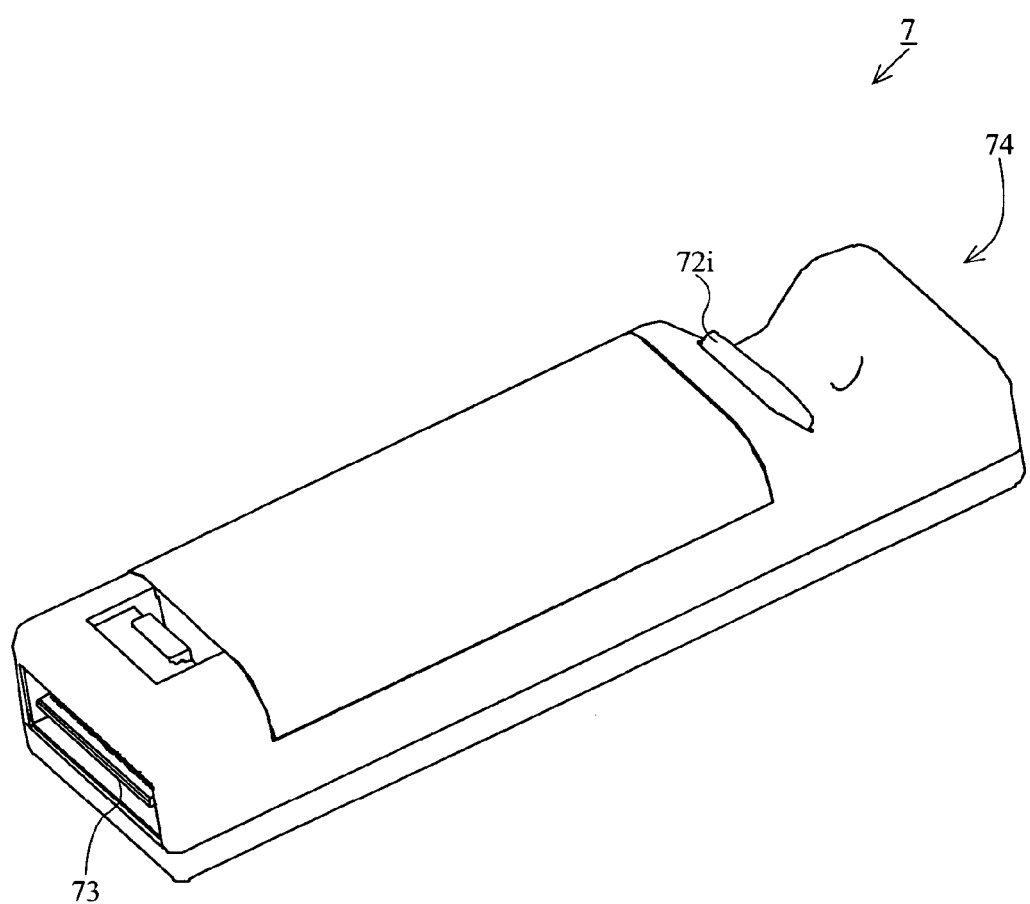
FIG. 4 is a perspective view showing the controller 7 of FIG. 3 as viewed from the lower rear side.

Referring now to FIGS. 3 and 4, the controller 7 will be described. FIG. 3 is a perspective view showing the controller 7 as viewed from the upper rear side. FIG. 4 is a perspective view showing the controller 7 as viewed from the lower rear side.

The controller 7 shown in FIGS. 3 and 4 includes a housing 71 formed by molding a plastic material, for example, and a plurality of control sections 72 are provided on the housing 71. The housing 71 has a generally rectangular parallelepiped shape, with the longitudinal direction being the front-rear direction, and has an overall size such that it can be held in a hand of an adult or a child.

A cross-shaped key 72a is provided on the upper surface of the housing 71, centered in the left/right direction and near the front end. The cross-shaped key 72a is a cross-shaped four-way push switch, in which four control portions associated with four different directions (forward, backward, left and right) indicated by arrows are provided in the protruding portions of the cross shape while being spaced apart from one another by 90°. The player can select one of the forward, backward, left and right directions by pressing down a corresponding one of the control portions of the cross-shaped key 72a. For example, the player can control the cross-shaped key 72a to move a player character, etc., in a virtual game world, or move a cursor, in a certain direction.

While the cross-shaped key 72a is a control section that outputs a control signal according to a direction input operation by the player, it may be any other suitable type of a control section. For example, the cross-shaped key 72a may be replaced by a combination switch including a ring-shaped four-way push switch and a center switch surrounded by the ring-shaped push switch. Alternatively, the cross-shaped key 72a may be replaced by a stick-shaped control section protruding from the upper surface of the housing 71, which outputs a control signal according to the direction in which it is tilted. Alternatively, the cross-shaped key 72a may be replaced by a horizontally-movable (slidable) disc-shaped control section, which outputs a control signal according to the direction in which it is slid. Alternatively, the cross-shaped key 72a may be replaced by a touch pad. Alternatively, the cross-shaped key 72a may be replaced by a control section including at least four switches associated with different directions (forward, backward, left and right), which outputs a control signal according to the switch pressed by the player.

A plurality of control buttons 72b to 72g are provided on the upper surface of the housing 71, closer to the rear end with respect to the cross-shaped key 72a. The control buttons 72b to 72g are control sections, each of which outputs a control signal associated therewith when being pressed by the player. For example, the control buttons 72b to 72d may be assigned a function as an X button, a Y button and a B button, respectively. For example, the control buttons 72e to 72g may be assigned a function as a select switch, a menu switch and a start switch, respectively. Each of the control buttons 72b to 72g is assigned a function as specified in the video game program executed by the video game device 3, the details of which will not be discussed herein as being not directly related to the description of the present invention. In the arrangement shown in FIG. 3, the control buttons 72b to 72d are arranged in the forward/backward direction while being centered in the left/right direction on the upper surface of the housing 71. The control buttons 72e to 72g are arranged in the left/right direction between the control buttons 72b and 72d on the upper surface of the housing 71. The control button 72f is buried under the upper surface of the housing 71 so as to prevent the player from pressing the button unintentionally.

A control button 72h is provided on the upper surface of the housing 71, closer to the front end with respect to the cross-shaped key 72a. The control button 72h is a power switch for remotely turning ON/OFF the power of the video game device 3 from a remote position. The control button 72h is also buried under the upper surface of the housing 71 so as to prevent the player from pressing the button unintentionally.

A plurality of LEDs 702 are provided on the upper surface of the housing 71, closer to the rear end with respect to the control button 72c. The controller 7 is given a controller ID (number) for identifying the controller 7 from others. The LEDs 702 may, for example, be used for notifying the player of the controller ID being currently assigned to the controller 7. Specifically, when transmit data is transmitted from the controller 7 to the receiver unit 6, one or more of the LEDs 34 are lit depending on the controller ID.

A depressed portion is formed on the lower surface of the housing 71. As will later be more apparent, the depressed portion of the lower surface of the housing 71 is located where the index or middle finger of the player lies when the player holds the controller 7. A control button 72i is provided on a slope on the rear side of the depressed portion. For example, the control button 72i is a control section that functions as an A button, and used as a trigger switch in a shooter video game or for directing the attention of a player object toward a predetermined object.

An image sensing device 743, forming a part of the image capturing/processing section 74, is formed on the front side of the housing 71. The image capturing/processing section 74 is a system for analyzing image data obtained by the controller 7 to determine each spot with high luminance and then to detect the centroid and the size thereof, and has a maximum sampling frequency of about 200 frames per second, for example, and is thus capable of following fast movements of the controller 7. The details of the configuration of the image capturing/processing section 74 will be described later. A connector 73 is provided on the rear side of the housing 71. The connector 73 is, for example, a 32-pin edge connector, and is used for connection between the controller 7 and a connection cable, which can be fitted into the connector.

Figures 5A, 5B:
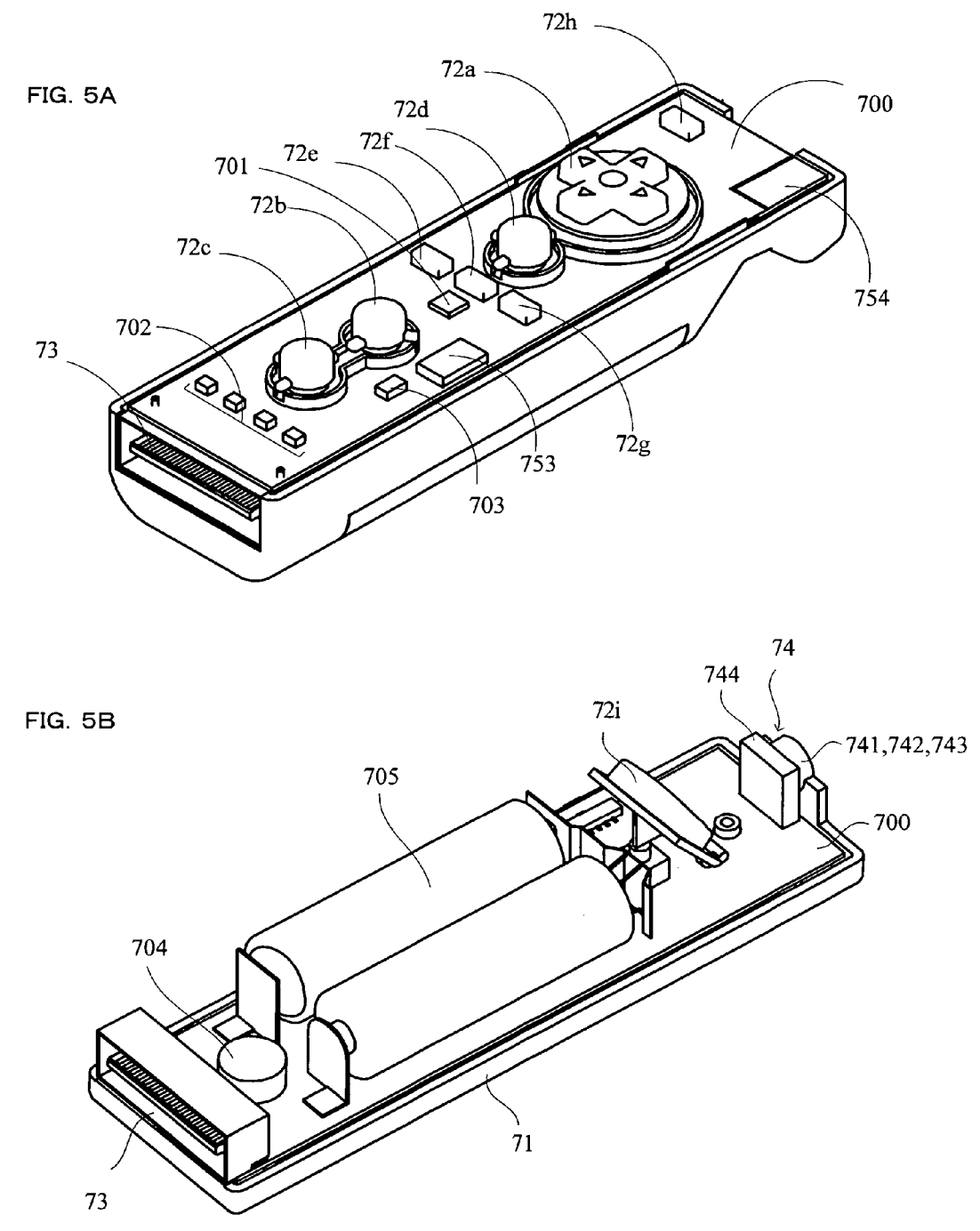

Referring now to FIGS. 5A and 5B, an internal configuration of the controller 7 will be described. FIG. 5A is a perspective view showing the controller 7 with an upper casing (a part of the housing 71) taken off. FIG. 5B is a perspective view showing the controller 7 with a lower casing (a part of the housing 71) taken off. FIG. 5A shows one side of a substrate 700, and FIG. 5B shows the other side thereof.

In FIG. 5A, the substrate 700 is secured in the housing 71, and the control buttons 72a to 72h, an acceleration sensor 701, the LEDs 702, a quartz oscillator 703, a wireless module 753, an antenna 754, etc., are provided on the upper principal plane of the substrate 700. These components are connected to a microcomputer 751 (see FIG. 6) via lines (not shown) formed on the substrate 700, etc. With the wireless module 753 and the antenna 754, the controller 7 can function as a wireless controller. The quartz oscillator 703 generates a basic clock for the microcomputer 751.

Referring to FIG. 5B, the image capturing/processing section 74 is provided at the front edge on the lower principal plane of the substrate 700. The image capturing/processing section 74 includes an infrared filter 741, a lens 742, the image sensing device 743 and an image processing circuit 744 provided in this order from the front side of the controller 7, and these components are provided on the lower principal plane of the substrate 700. The connector 73 is provided at the rear edge on the lower principal plane of the substrate 700. The control button 72i is provided on the lower principal plane of the substrate 700 behind the image capturing/processing section 74, and battery cells 705 are accommodated in a position further behind the control button 72i. A vibrator 704 is provided on the lower principal plane of the substrate 700 between the battery cells 705 and the connector 73. The vibrator 704 may be, for example, a vibrating motor or a solenoid. As the vibrator 704 is actuated, the controller 7 is vibrated, and the vibration is transmitted to the hand of the player holding the controller 7, thus realizing a video game with vibration feed back.

Referring now to FIG. 6, an internal configuration of the controller 7 will be described. FIG. 6 is a block diagram showing a configuration of the controller 7.

Referring to FIG. 6, in addition to the control section 72 and the image capturing/processing section 74, the controller 7 includes therein the communications section 75 and the acceleration sensor 701.

Specifically, the image capturing/processing section 74 includes the infrared filter 741, the lens 742, the image sensing device 743 and the image processing circuit 744. The infrared filter 741 passes only an infrared portion of incident light entering the controller 7 from the front side. The lens 742 condenses the infrared light passing through the infrared filter 741, and outputs the condensed infrared light to the image sensing device 743. The image sensing device 743 is a solid-state image sensing device, such as a CMOS sensor or a CCD, for capturing the infrared light condensed through the lens 742. Therefore, the image sensing device 743 produces image data by capturing only the infrared light that has passed through the infrared filter 741. The image data produced by the image sensing device 743 is processed in the image processing circuit 744. Specifically, the image processing circuit 744 processes the image data obtained from the image sensing device 743 to detect high-luminance portions and obtain positions and areas thereof, and the image processing circuit 744 outputs the process result data representing the obtained positions and areas to the communications section 75. The image capturing/processing section 74 is secured in the housing 71 of the controller 7, and the image-capturing direction can be changed by changing the direction of the housing 71 itself. As will later be more apparent, it is possible to obtain a signal according to the position or movement of the controller 7 based on the process result data outputted from the image capturing/processing section 74.

The acceleration sensor 701 detects the acceleration in each of three directions, i.e., the up/down direction, the left/right direction and the forward/backward direction of the controller 7. The acceleration sensor 701 may alternatively be an acceleration sensor capable of determining the acceleration in each of two directions, i.e., the up/down direction and the left/right direction, depending on types of control signals necessary. The data representing the acceleration determined by the acceleration sensor 701 is outputted to the communications section 75.

As a non-limiting example, the three-axis or two-axis linear accelerometer 701 may be of the type available from Analog Devices, Inc. or STMicroelectronics N.V. Preferably, the acceleration sensor 701 is an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the three-axis or two-axis acceleration sensor 701.

As one skilled in the art understands, linear accelerometers, as used in acceleration sensor 701, are only capable of detecting acceleration along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 701, additional information relating to the controller 7 can be inferred or calculated, as one skilled in the art will readily understand from the description herein. For example, by detecting static, linear acceleration (i.e., gravity), the linear acceleration output of the acceleration sensor 701 can be used to infer tilt of the object relative to the gravity vector by correlating tilt angles with detected linear acceleration. In this way, the acceleration sensor 701 can be used in combination with the micro-computer 751 (or another processor) to determine tilt, attitude or position of the controller 7. Similarly, various movements and/or positions of the controller 7 can be calculated or inferred through processing of the linear acceleration signals generated by the acceleration sensor 701 when the controller 7 containing the acceleration sensor 701 is subjected to dynamic accelerations by, for example, the hand of a user, as explained herein. In another embodiment, the acceleration sensor 701 may include an embedded signal processor or other type of dedicated processor for performing any desired processing of the acceleration signals output from the accelerometers therein prior to outputting signals to microcomputer 751. For example, the embedded or dedicated processor could convert the detected acceleration signal to a corresponding tilt angle when the acceleration sensor is intended to detect static acceleration (i.e., gravity).

In another exemplary embodiment, the acceleration sensor 701 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 701, a gyro-sensor is capable of directly detecting rotation (or angular rate) around an axis defined by the gyroscopic element (or elements) therein. Thus, due to the fundamental differences between a gyro-sensor and an linear acceleration sensor (e.g., angle-based vs. vector-based output), corresponding changes need to be made to the processing operations that are performed on the output signals from these devices depending on which device is selected for a particular application. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communications section 75 includes the microcomputer 751, a memory 752, the wireless module 753 and the antenna 754. The microcomputer 751 controls the wireless module 753 for wirelessly transmitting transmit data while using the memory 752 as a memory area.

A control signal (key data) from the control section 72 provided in the controller 7, an acceleration signal (acceleration data) from the acceleration sensor 701 and process result data from the image capturing/processing section 74 are outputted to the microcomputer 751. The microcomputer 751 temporarily stores the received data (the key data, the acceleration data and the process result data) in the memory 752 as transmit data to be transmitted to the receiver unit 6. Data are wirelessly transmitted from the communications section 75 to the receiver unit 6 at regular intervals. Since the game process typically proceeds in a cycle of 1/60 second, the interval should be shorter than 1/60 second. Specifically, the game process proceeds in a cycle of 16.7 ms (1/60 second), and the data transmission interval of the communications section 75 using the Bluetooth (registered trademark) technique is 5 ins. At the transmission timing for transmitting data to the receiver unit 6, the microcomputer 751 outputs, as a series of control data, transmit data stored in the memory 752 to the wireless module 753. The wireless module 753 uses a technique such as Bluetooth (registered trademark) to transform control data into a radio wave signal using a carrier of a predetermined frequency, and radiates the radio wave signal from the antenna 754. Thus, the key data from the control section 72 provided in the controller 7, the acceleration data from the acceleration sensor 701 and the process result data from the image capturing/processing section 74 are transmitted from the controller 7. The radio wave signal is received by the receiver unit 6 of the video game device 3, and is demodulated and decoded by the video game device 3, thereby obtaining the series of control data (the key data, the acceleration data and the process result data). The CPU 30 of the video game device 3 performs the game process based on the obtained control data and the video game program. Where the communications section 75 uses a Bluetooth (registered trademark) technique, the communications section 75 can also receive transmit data wirelessly transmitted from other devices.

Figure 7:
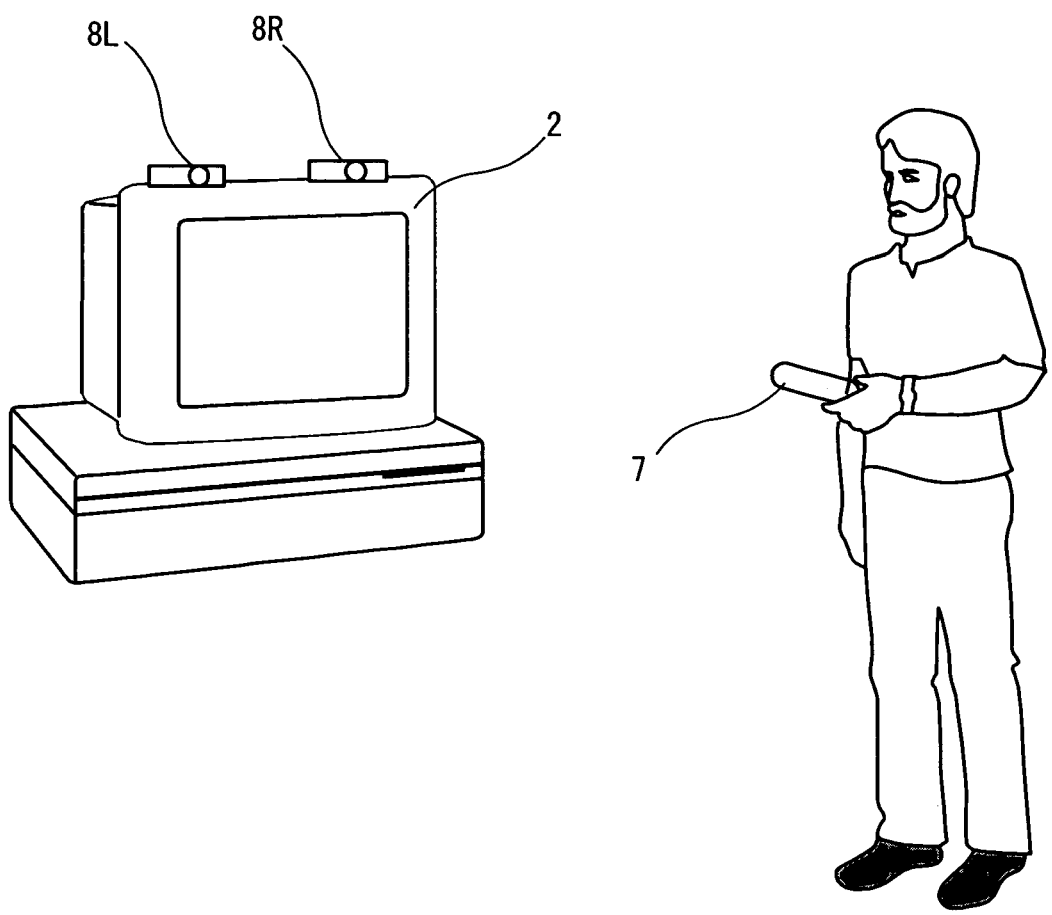
FIG. 7 generally shows how the player uses the controller 7 of FIG. 3 to perform a game operation.
Figure 8:
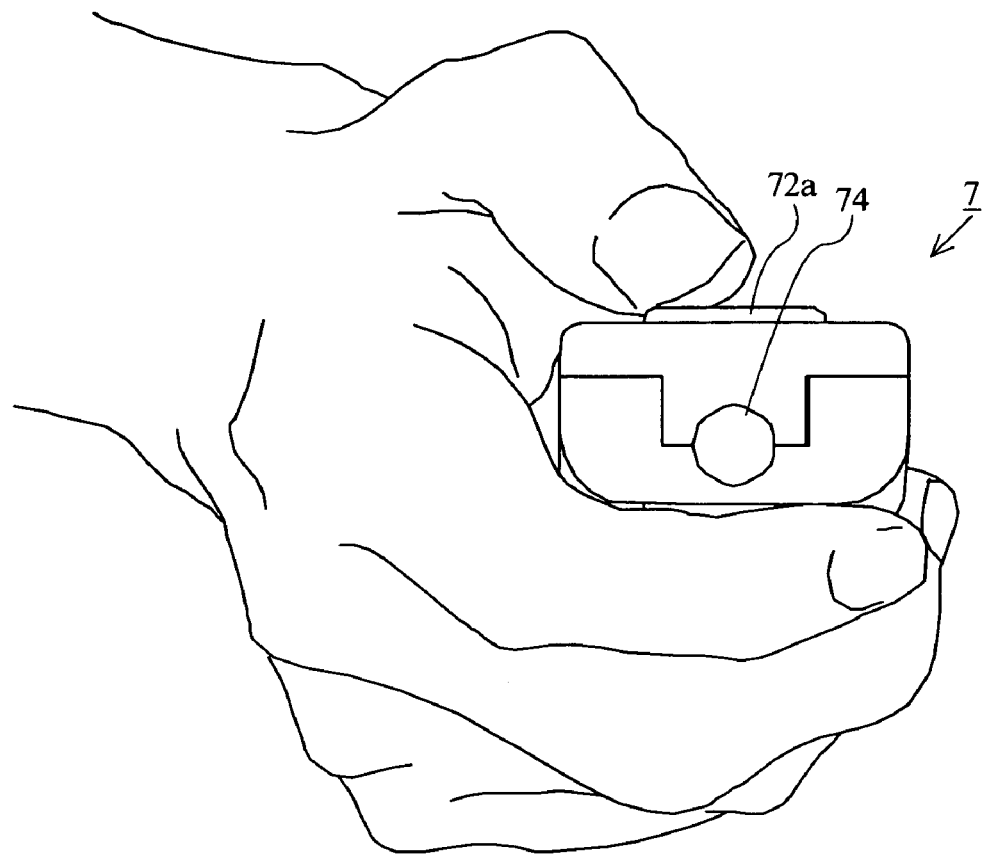
FIG. 8 shows the controller 7 being held in the player's right hand, as viewed from the front side.

As shown in FIG. 7, when playing the game on the video game system 1 by using the controller 7, the player holds the controller 7 in one hand (the right hand, for example) (see FIGS. 8 and 9). The player holds the controller 7 with the front side of the controller 7 (the side for receiving light to be sensed by the image capturing/processing section 74) facing toward the monitor 2. The two markers 8L and 8R are provided around the display screen of the monitor 2. The markers 8L and 8R output infrared light to the front side of the monitor 2, and serve as imaging targets to be captured by the image capturing/processing section 74.

As the player holds the controller 7 so that the front surface thereof faces the monitor 2, the image capturing/processing section 74 receives infrared light outputted from the two markers 8L and 8R. Then, the image sensing device 743 captures the incident infrared light via the infrared filter 741 and the lens 742, and the image processing circuit 744 processes the captured image. The image capturing/processing section 74 detects the infrared light component outputted from the markers 8L and 8R, thereby obtaining the positions of the markers 8L and 8R (the position of the target image) in the captured image or the area information thereof. Specifically, the image processing circuit 744 analyzes the image data captured by the image sensing device 743 to first exclude, from the area information, images that cannot possibly be the infrared light from the markers 8L and 8R, and then identify high-luminance points to be the positions of the markers 8L and 8R. Then, the image capturing/processing section 74 obtains position information, e.g., the centroid, of the identified bright spots, and outputs the obtained position information as the process result data. The position information, being the process result data, may be coordinate values with respect to a predetermined reference point in the captured image (e.g., the center or the upper left corner of the captured image) being the origin, or may alternatively be a vector representing the difference between the current bright spot position and a reference point being the bright spot position at a predetermined point in time. Thus, the position information of the target image is a parameter used as the difference with respect to a predetermined reference point, which is defined in the captured image captured by the image sensing device 743. As the process result data is transmitted to the video game device 3, the video game device 3 can obtain, based on the difference between the position information and the reference, the amount of change in the signal according to the movement, the orientation, the position, etc., of the image capturing/processing section 74, i.e., the controller 7, with respect to the markers 8L and 8R. Specifically, as the controller 7 is moved around, the positions of the high-luminance points in the image transmitted from the communications section 75 change. Therefore, by making a direction input or a position input according to the change in the positions of the high-luminance points, it is possible to make a direction input or a position input to a three-dimensional space according to the direction in which the controller 7 is moved. In a game process example to be described later, the image capturing/processing section 74 obtains the centroid position for each of the target images of the markers 8L and 8R in the captured image, and outputs the obtained centroid position as the process result data.

Thus, the image capturing/processing section 74 of the controller 7 captures the image of fixed markers (infrared light from the two markers 8L and 8R in the present embodiment), whereby it is possible to make a control input according to the movement, the orientation, the position, etc., of the controller 7 by processing data outputted from the controller 7 in the game process performed by the video game device 3, thus realizing an intuitive control input, different from those using control buttons and control keys where the player presses the buttons or the keys. Since the markers are provided around the display screen of the monitor 2, a position with respect to the markers can easily be converted to the movement, the orientation, the position, etc., of the controller 7 with respect to the display screen of the monitor 2. Thus, the process result data based on the movement, the orientation, the position, etc., of the controller 7 can be used as a control input that is directly reflected on the display screen of the monitor 2. In the video game system 1, by using the captured image obtained by capturing the markers 8L and 8R, the distance from the markers 8L and 8R to the controller 7 can also be used as a control input that is directly reflected on the display screen of the monitor 2, the details of which will be described later.

Referring to FIGS. 8 and 9, how the player holds the controller 7 in one hand will be described. FIG. 8 shows the controller 7 being held in the player's right hand, as viewed from the front side of the controller 7. FIG. 9 shows the controller 7 being held in the player's right hand, as viewed from the left side of the controller 7.

As shown in FIGS. 8 and 9, the controller 7 has an overall size such that it can be held in a hand of an adult or a child. When the player's thumb is placed on the upper surface of the controller 7 (e.g., near the cross-shaped key 72a) and the player's index finger is placed in the depressed portion of the controller 7 (e.g., near the control button 72i), the light receiving port of the image capturing/processing section 74 provided on the front side of the controller 7 is exposed to the front side of the player. It is understood that the controller 7 can be held similarly by the player's left hand.

With the controller 7 being held in one hand of the player, the player can easily operate the control section 72, e.g., the cross-shaped key 72a or the control button 72i. With the controller 7 being held in one hand of the player, the light receiving port of the image capturing/processing section 74 provided on the front side of the controller 7 is exposed, whereby infrared light from the two markers 8L and 8R can easily be received through the light receiving port. In other words, the player can hold the controller 7 in one hand without blocking any function of the image capturing/processing section 74 of the controller 7. Therefore, as the player moves the hand holding the controller 7 with respect to the display screen, the controller 7 is further provided with a control input function in which the movement of the player's hand is directly reflected on the display screen.

Figure 10:
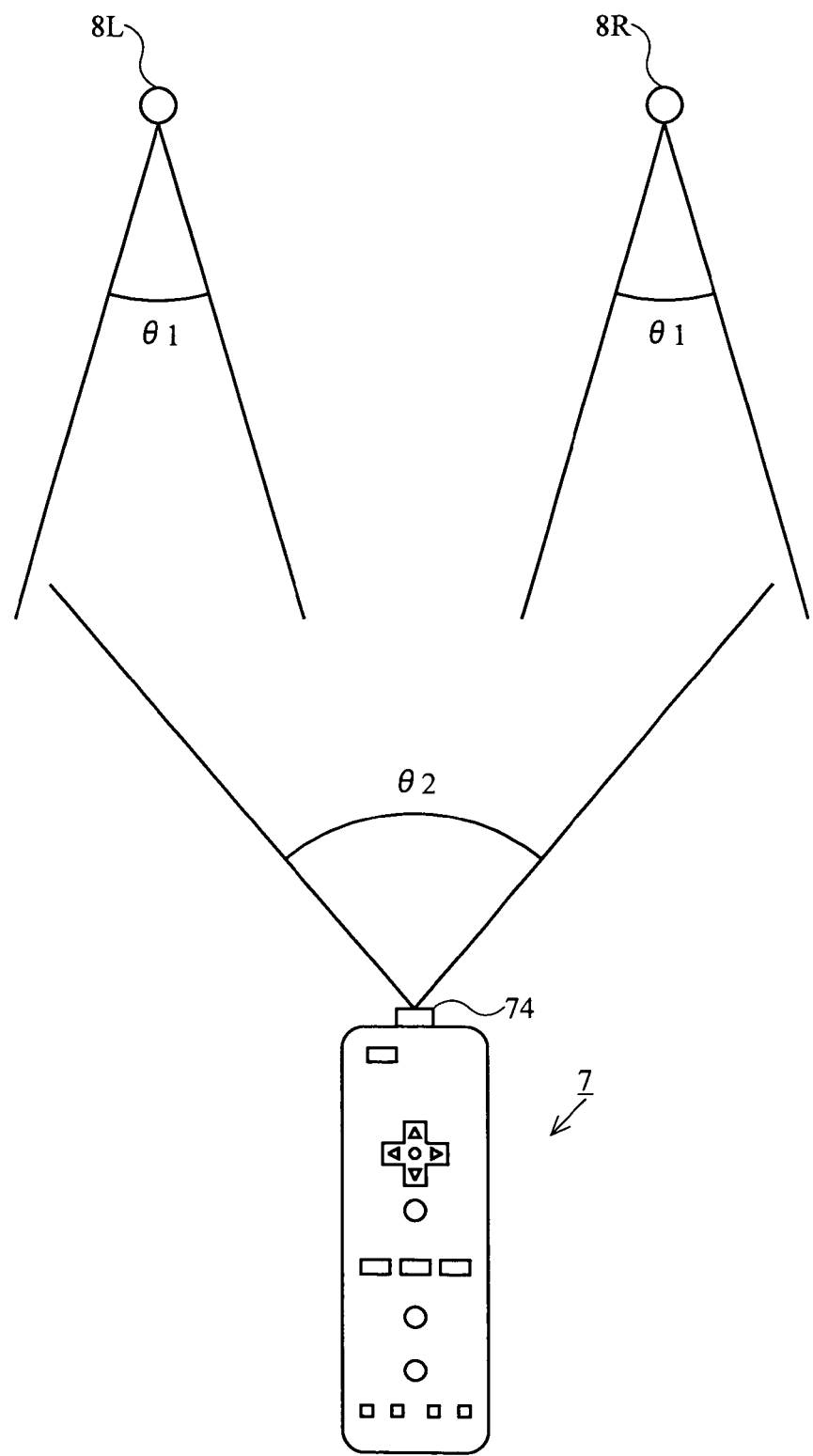
FIG. 10 shows viewing angles between markers 8L and 8R and an image capturing/processing section 74.

As shown in FIG. 10, the markers 8L and 8R each have a viewing angle $\theta 1$. The image sensing device 743 has a viewing angle $\theta 2$. For example, the viewing angle $\theta 1$ of each of the markers 8L and 8R is 34° (half angle), and the viewing angle $\theta 2$ of the image sensing device 743 is 41°. When the markers 8L and 8R are both present within the viewing angle $\theta 2$ of the image sensing device 743 and when the image sensing device 743 is present within the viewing angle $\theta 1$ of the marker 8L and within the viewing angle $\theta 1$ of the marker 8R, the video game device 3 detects the position of the controller 7 (including the distance from the markers 8L and 8R) by using the position data of the high-luminance points of the two markers 8L and 8R.

Figure 11:
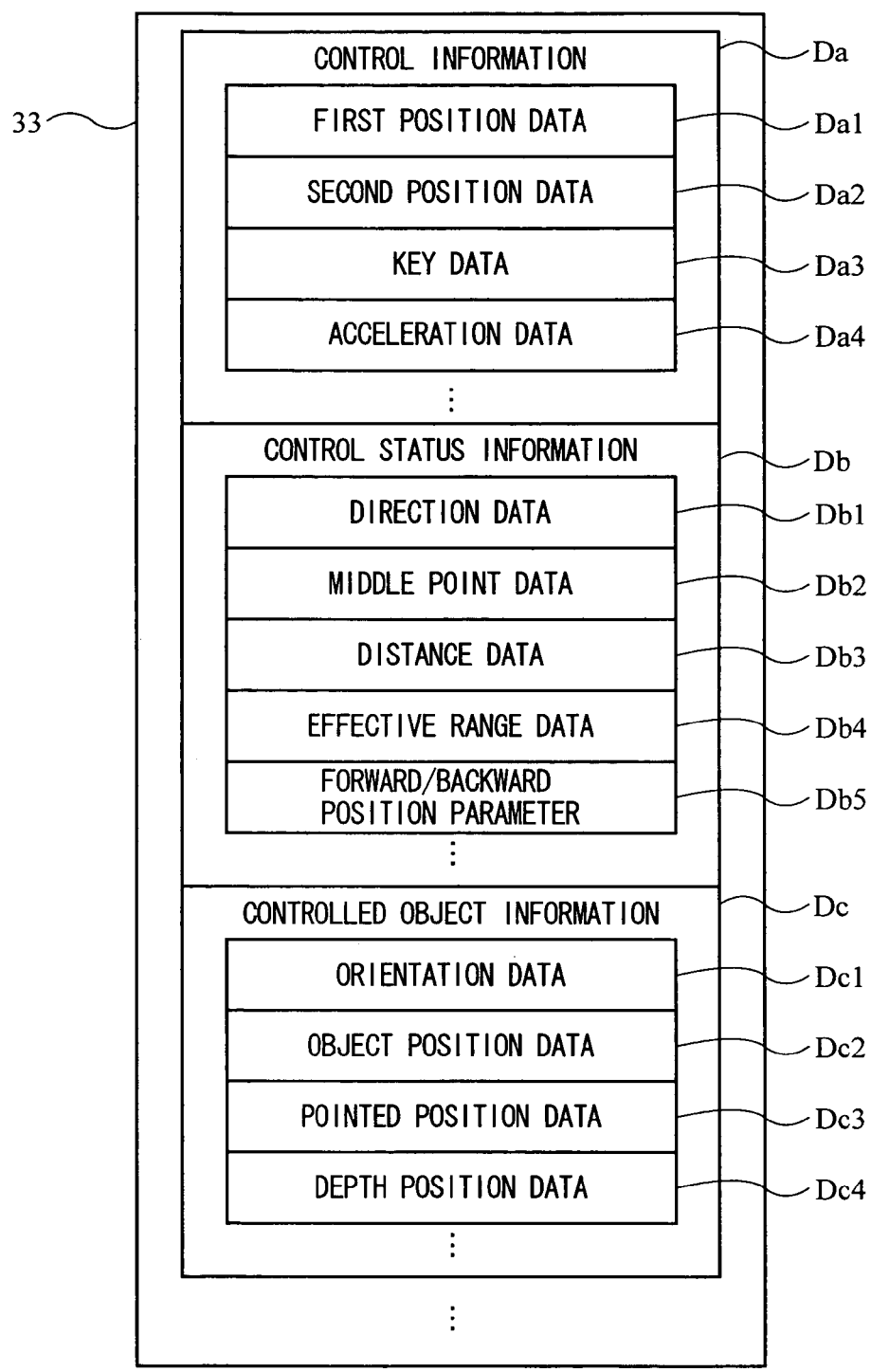
FIG. 11 shows important data to be stored in a main memory 33 of the video game device 3.

The details of the game process performed in the video game system 1 will now be described. First, important data to be used in the game process will be described with reference to FIG. 11. FIG. 11 shows important data to be stored in the main memory 33 of the video game device 3.

Referring to FIG. 11, the main memory 33 stores control information Da, control status information Db, controlled object information Dc, etc. In addition to those shown in FIG. 11, the main memory 33 also stores other data necessary for the game process, such as player character data (e.g., the image data and the position data of the player character), and game space data (e.g., the terrain data).

The control data Da is a series of control data transmitted from the controller 7 as transmit data, and is updated to the latest control data. The control information Da includes first position data Da1 and second position data Da2, corresponding to the process result data described above. The first position data Da1 represents the position (coordinates) of the image of one of the two markers 8L and 8R in the captured image captured by the image sensing device 743. The second position data Da2 represents the position (coordinates) of the image of the other marker in the captured image. For example, the position of the image of a marker is represented by a set of coordinates in an XY coordinate system of the captured image.

In addition to the position data (the first position data Da1 and the second position data Da2) being an example of the process result data obtained from the captured image, the control information Da includes the key data Da3 obtained from the control section 72, the acceleration data Da4 obtained from the acceleration sensor 701, etc. The receiver unit 6 provided in the video game device 3 receives the control information Da transmitted from the controller 7 at a regular interval (e.g., 5 ms), and the received data are stored in a buffer (not shown) of the receiver unit 6. The stored data is read out, for example, in a cycle of one frame (1/60 second), being the game process interval, and the latest information is stored in the main memory 33.

The control status information Db represents the status of the controller 7, as determined based on the captured image. The control status information Db is data obtained based on the position and the direction of the target images (markers) included in the captured image. Specifically, the control status information Db includes direction data Db1, middle point data Db2, distance data Db3, effective range data Db4, a forward/backward position parameter Db5, etc. The direction data Db1 represents the direction from the first position data Da1 to the second position data Da2. It is assumed herein that the direction data Db1 represents a vector extending from the first position data Da1 to the second position data Da2. The middle point data Db2 represents the position (coordinates) of the middle point between the first position data Da1 and the second position data Da2. Where the images of the two markers (the markers 8L and 8R) are regarded as one target image, the middle point data Db2 represents the position of the target image. The distance data Db3 represents the distance d from the markers 8L and 8R to the controller 7, as calculated based on the first position data Da1 and the second position data Da2. The effective range data Db4 represents an effective range (to be described later), which is defined based on the distance d in order to obtain parameters to be used in the game process. The effective range data Db4 includes the length ("Lr") the end points ("min" "max") and the extension lengths ("a1" "a2") of the effective range. The forward/backward position parameter Db5 is a parameter ("r") calculated based on the position of the controller 7 (i.e., the distance d) with respect to the effective range, and is used in the game process as, for example, a parameter representing the depth of the three-dimensional virtual game space.

The controlled object information Dc represents the orientation and the position, or the pointed position, of the controlled object on the screen or in the game space. The controlled object as used herein refers to an object displayed on the screen or an object in a virtual game space. Where a three-dimensional virtual game space is created, the controlled object may be a virtual camera used for displaying the virtual game space on the screen. The controlled object information Dc includes orientation data Dc1, object position data Dc2, pointed position data Dc3 and depth position data Dc4. The orientation data Dc1 represents the orientation of the controlled object. The object position data Dc2 represents the position of the controlled object in the game space or the position thereof on the screen. The pointed position data Dc3 represents the position on the screen of the monitor 2 being pointed at by the controller 7 or the vertical/horizontal position in the three-dimensional virtual game space, as obtained from the first position data Da1 and the second position data Da2. The depth position data Dc4 represents the position in the depth direction of the three-dimensional virtual game space, as obtained from the forward/backward position parameter Db5.

Figure 12:
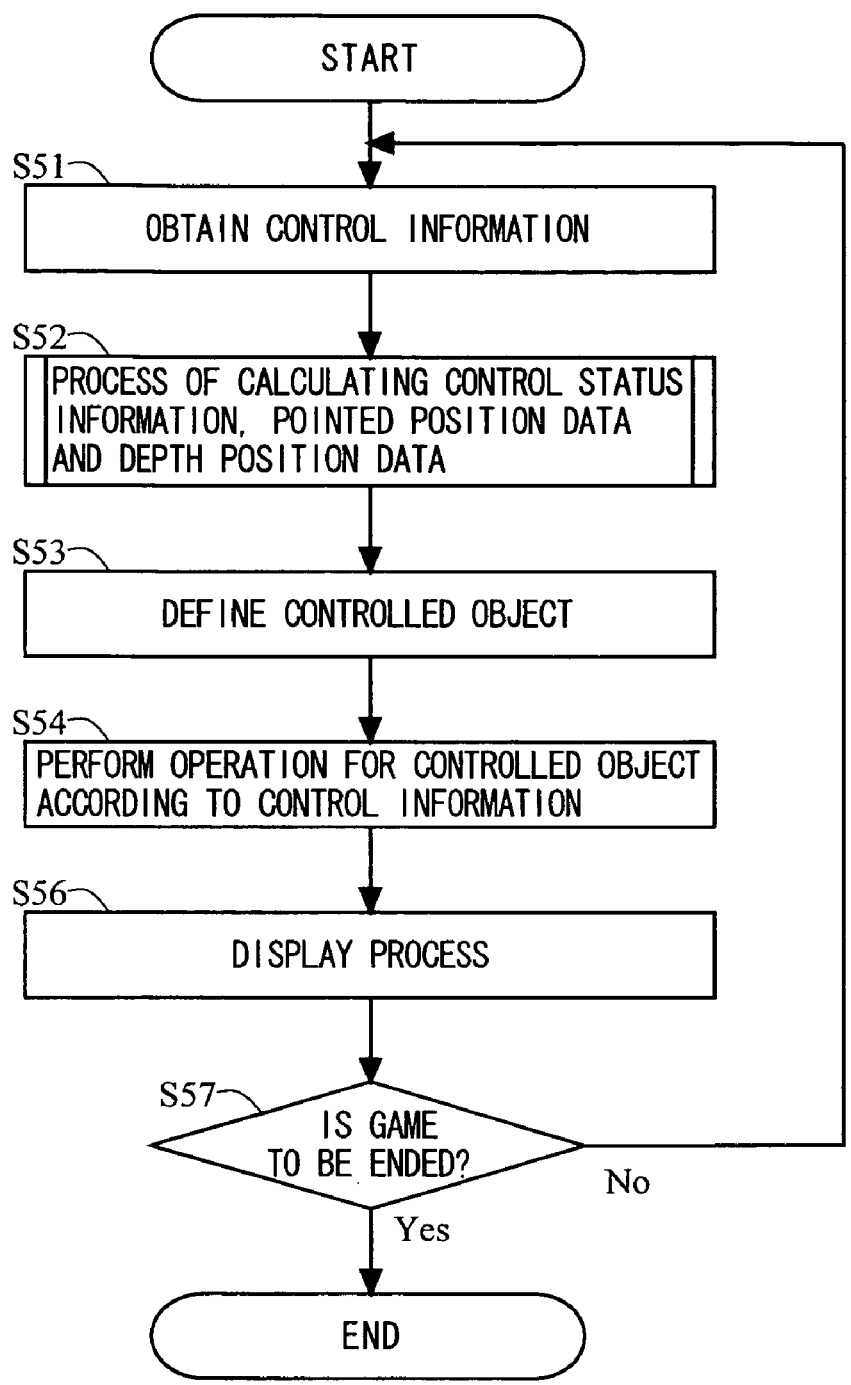
FIG. 12 is a flow chart showing the game process performed by the video game device 3.
Figure 13:
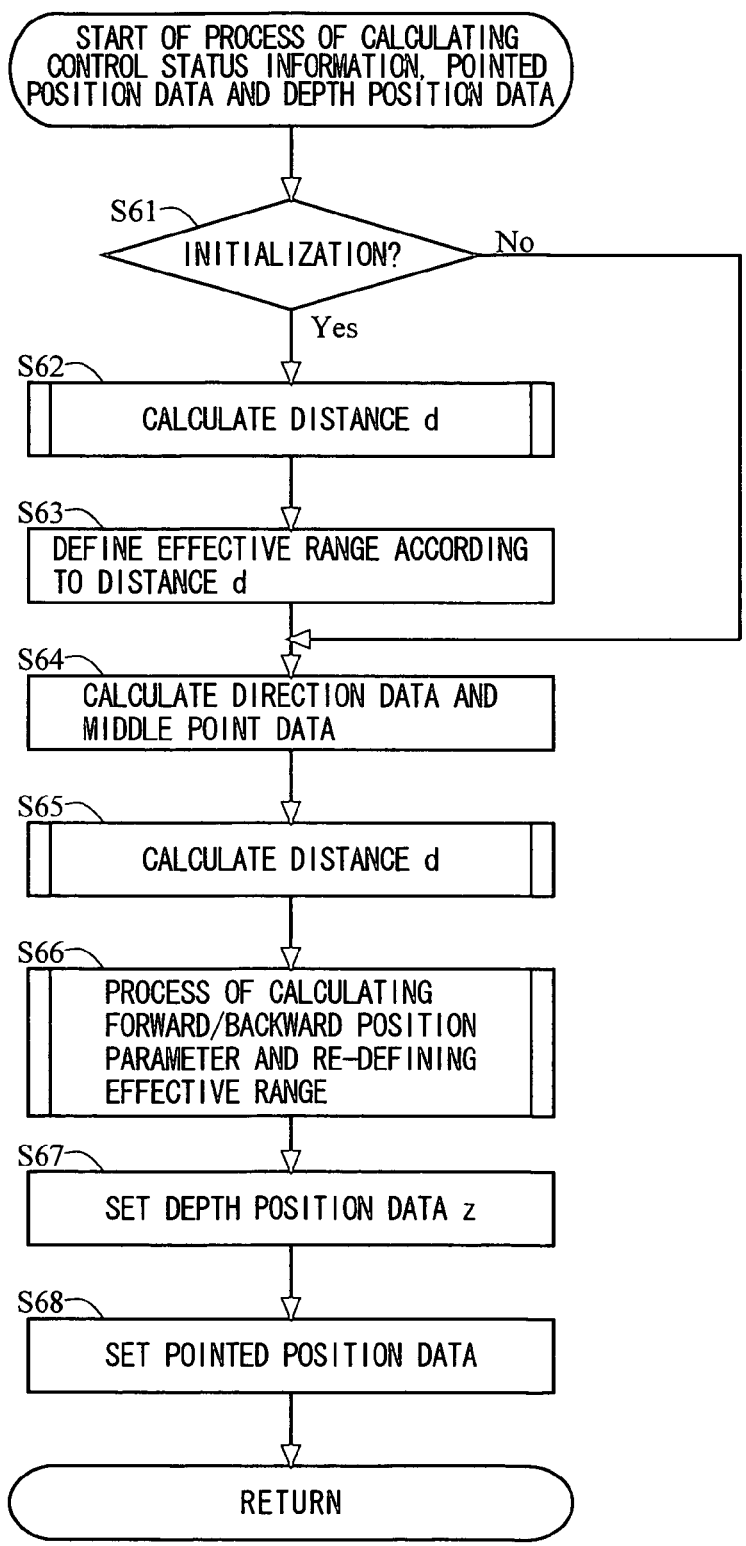
FIG. 13 shows, in detail, a subroutine of step 52 in FIG. 12 for the process of calculating control status information, pointed position data and depth position data.
Figure 14:
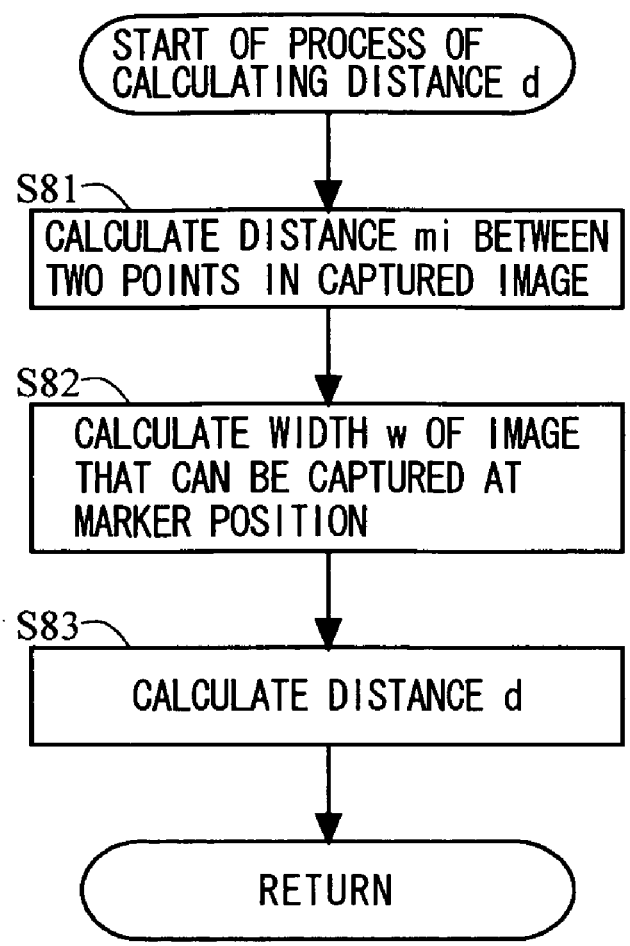
FIG. 14 shows, in detail, a subroutine of steps 62 and 65 in FIG. 13 for the process of calculating a distance d.
Figure 15:
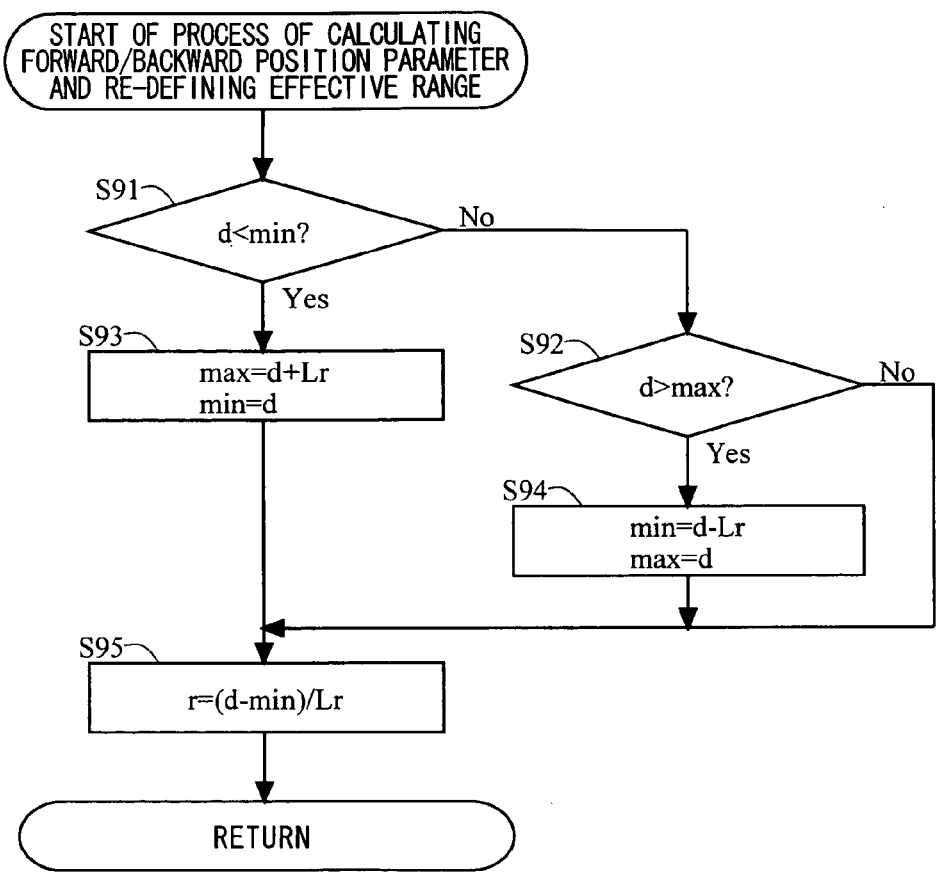
FIG. 15 shows, in detail, a subroutine of step 66 in FIG. 13 for the process of calculating the forward/backward position parameter and re-defining the effective range.
Figure 16:
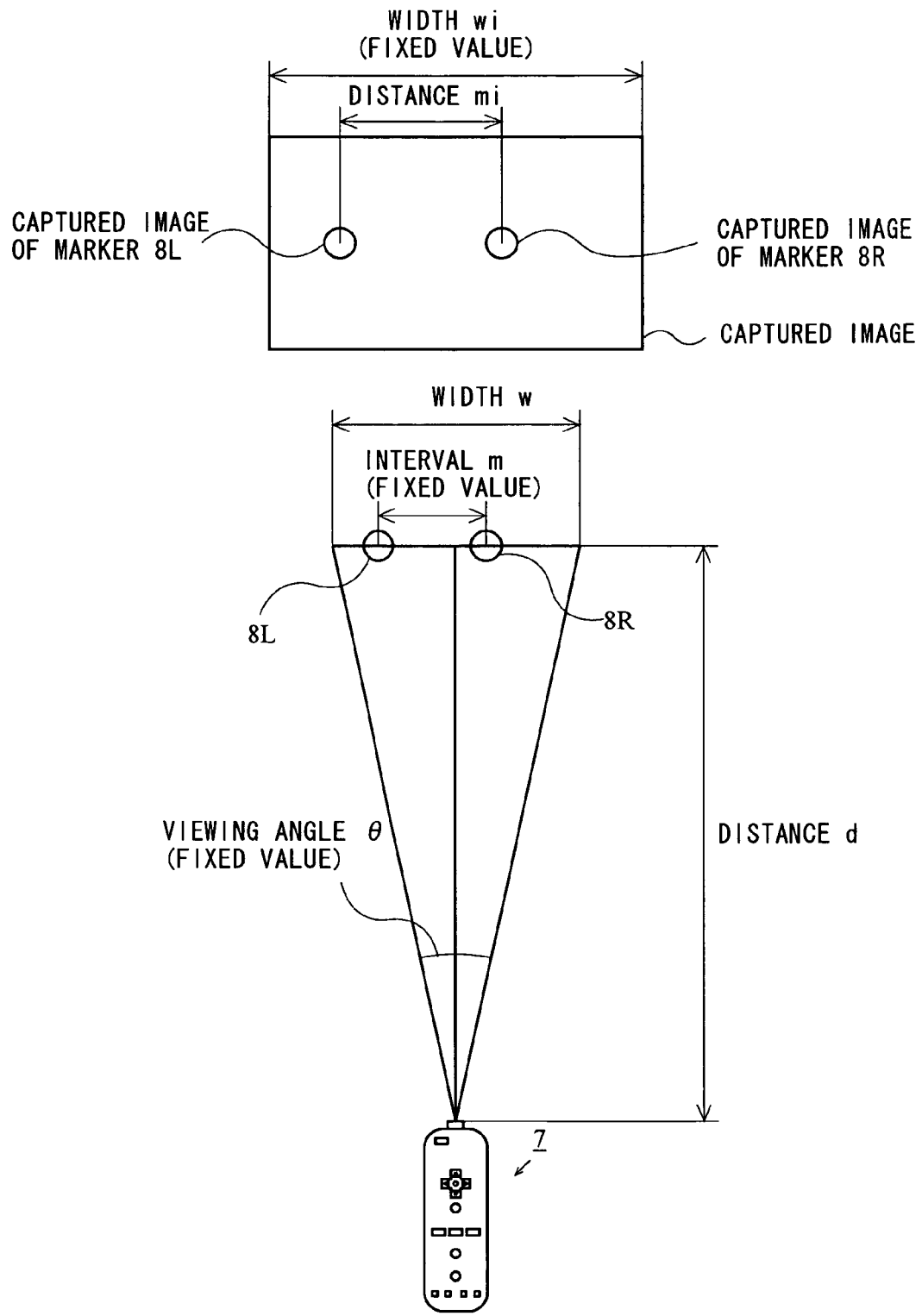
FIG. 16 shows the operation of calculating the distance d.
Figure 17A:
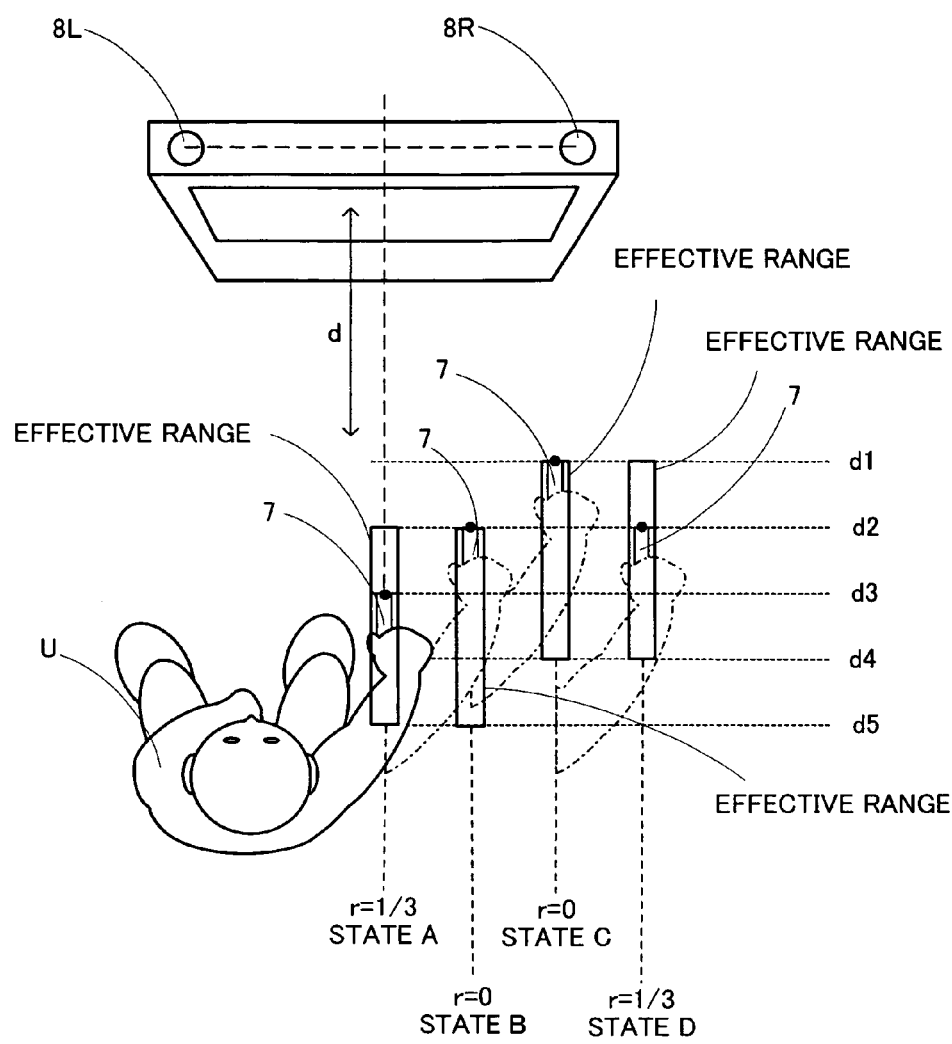
FIGS. 17A and 17B show the operation of calculating the forward/backward position parameter r and defining the effective range according to the subroutine shown in FIG. 13.
Figure 17B:
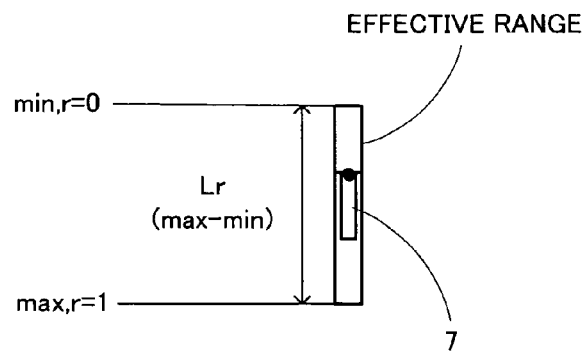
Figure 18:
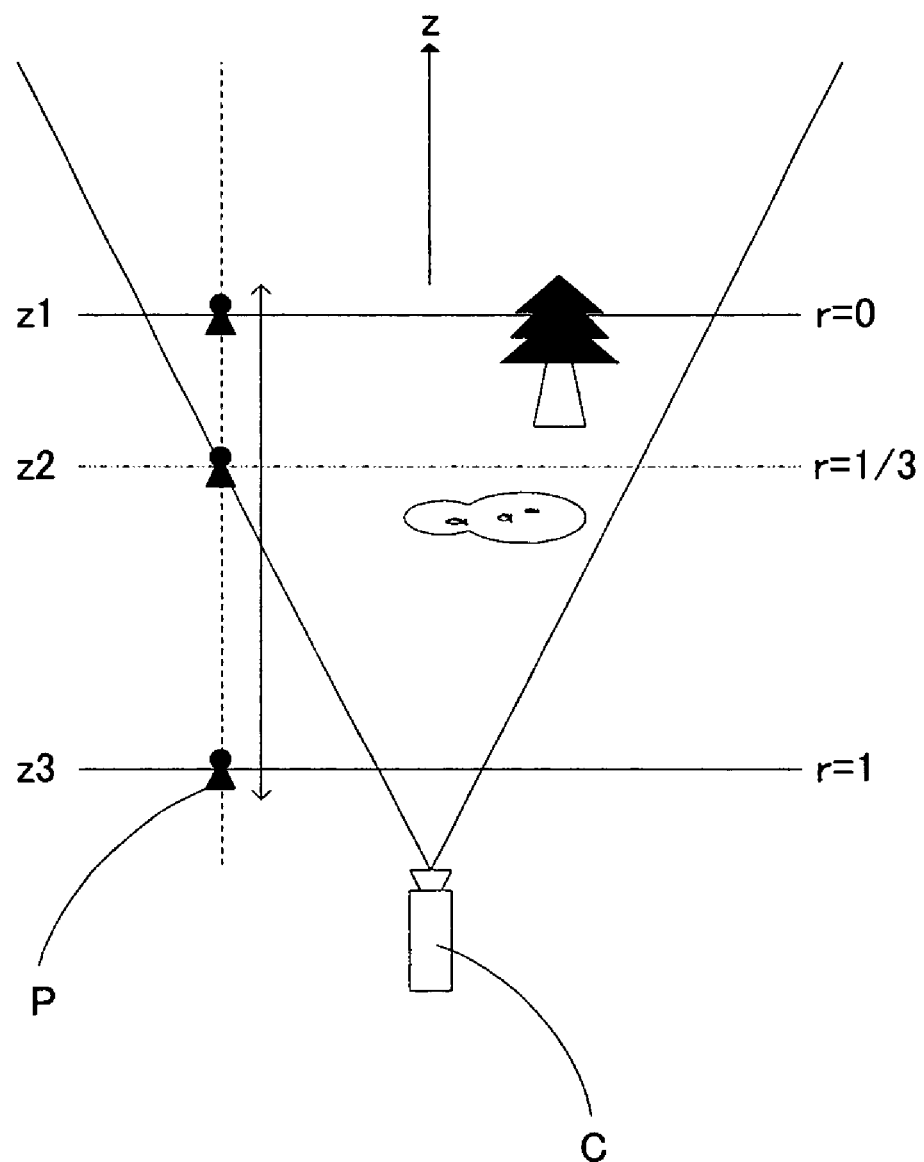
FIG. 18 shows an exemplary relationship between the forward/backward position parameter r and the depth position data z defined in a three-dimensional game space.
Figure 19:
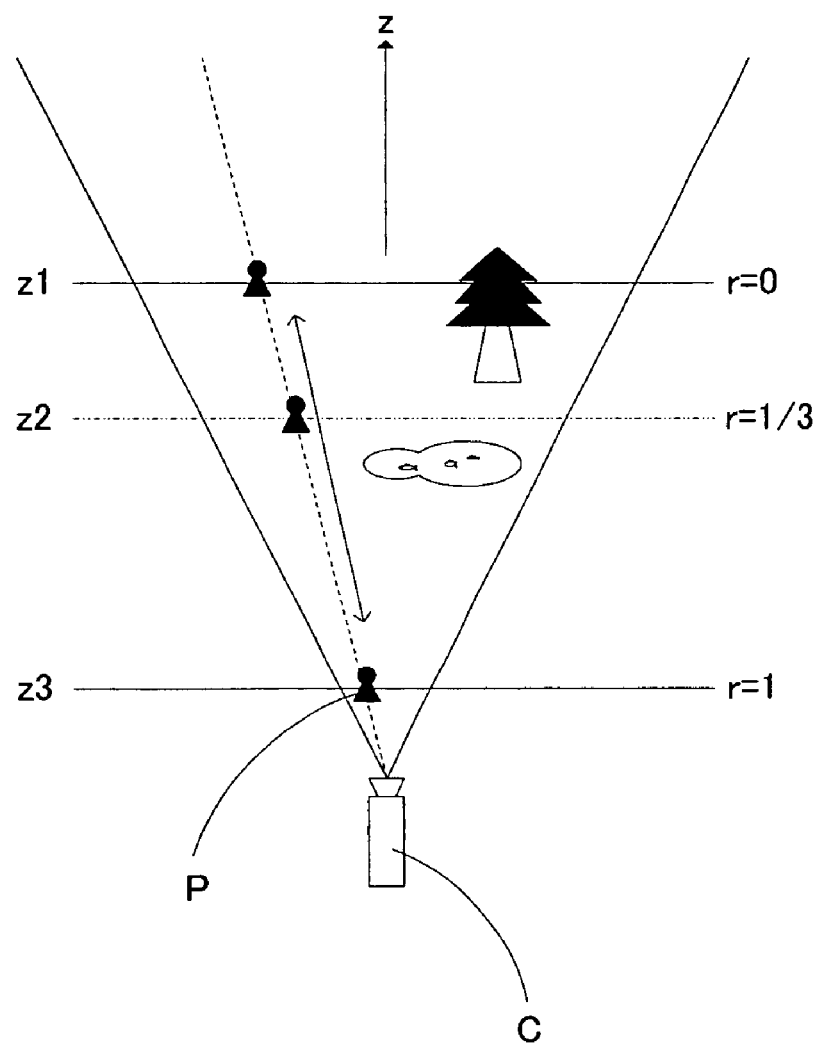
FIG. 19 shows another exemplary relationship between the forward/backward position parameter r and the depth position data z defined in the three-dimensional game space.

Referring now to FIGS. 12 to 19, the details of the game process performed by the video game device 3 will be described. FIG. 12 is a flow chart showing the game process performed by the video game device 3. FIG. 13 shows, in detail, a subroutine of step 52 in FIG. 12 for the process of calculating the control status information, the pointed position data and the depth position data. FIG. 14 shows, in detail, a subroutine of steps 62 and 65 in FIG. 13 for the process of calculating the distance d. FIG. 15 shows, in detail, a subroutine of step 66 in FIG. 13 for the process of calculating the forward/backward position parameter and re-defining the effective range. FIG. 16 shows the operation of calculating the distance d. FIGS. 17A and 17B show the operation of calculating the forward/backward position parameter r and defining the effective range according to the subroutine shown in FIG. 13. FIGS. 18 and 19 each show the relationship between the forward/backward position parameter r and the depth position data z defined in the three-dimensional game space. In the flow charts of FIGS. 12 to 15, parts of the game process performed based on the game operation with the controller 7 are shown, and other parts of the game process that are not directly related to the present invention will not be shown. In FIGS. 12 to 15, each step performed by the CPU 30 is denoted by an abbreviation "S" plus the step number.

When the power of the video game device 3 is turned ON, the CPU 30 of the video game device 3 executes a boot program stored in a boot ROM (not shown), thus initializing various units such as the main memory 33. The video game program stored in the optical disk 4 is loaded to the main memory 33, and the CPU 30 starts executing the video game program. The flow charts of FIGS. 12 to 15 show the game process performed after the completion of the process described above.

Referring to FIG. 12, the CPU 30 obtains control data received from the controller 7 (step 51), and proceeds to the next step. The CPU 30 stores the control data in the main memory 33 as the control information Da. In addition to the position data representing the positions of the markers 8L and 8R in the captured image (the first position data Da1 and the second position data Da2), the control data obtained in step 51 includes data representing how the control section 72 of the controller 7 is being operated (the key data Da3), and data representing the acceleration detected by the acceleration sensor 701 (the acceleration data Da4). In the illustrated example, the communications section 75 transmits the control data to the video game device 3 at a predetermined time interval (e.g., 5 ms). It is assumed that the CPU 30 uses the control data every frame. Therefore, the operation loop through steps 51 to 57 shown in FIG. 12 is iterated once per frame.

Then, the CPU 30 calculates the control status information, the pointed position data and the depth position data (step 52), and proceeds to the next step. In the process of calculating the control status information, the pointed position data and the depth position data, the CPU 30 calculates the status of the controller 7 (the movement, the position, the orientation, etc., of the controller 7), based on the stored first and second position data Da1 and Da2 transmitted from the controller 7. Referring now to FIG. 13, the operation of step 52 will be described in detail.

Referring to FIG. 13, the CPU 30 determines whether or not to perform the initialization process (step 61). For example, where the effective range has already been defined, the CPU 30 determines that the initialization process has been performed (No in step 61), and proceeds to step 64. Where the effective range has not been defined or where the first position data Da1 and the second position data Da2 are once discontinued and then resumed (i.e., where the markers 8L and 8R once fall out of the image-capturing range of the image sensing device 743 and then come back into the image-capturing range), the CPU 30 determines that the initialization process is needed (Yes in step 61), and proceeds to step 62.

In step 62, the CPU 30 calculates the distance d using the first position data Da1 and the second position data Da2, and stores the calculated distance d as the distance data Db3 in the main memory 33. Referring now to FIGS. 14 and 16, the details of the process of calculating the distance d will be described.

Referring to FIGS. 14 and 16, the CPU 30 calculates the distance mi (see FIG. 16) between two points in the captured image (step 81). The two points correspond to the images of the markers 8L and 8R, and the positions (coordinates) thereof are obtained as the first position data Da1 and the second position data Da2. Therefore, the CPU 30 can calculate the distance mi using the first position data Da1 and the second position data Da2.

Then, the CPU 30 calculates the width w (see FIG. 16) of an image that can be captured by the image sensing device 743 at the position of the markers 8L and 8R (step 82). Specifically, the CPU 30 calculates the width w as follows.

$$w = wi \times m / mi$$

In the expression, m is the interval between the markers 8L and 8R (e.g., 30 cm), and is a fixed value. Moreover, wi is the width of the captured image of the image sensing device 743 for the width w, and is also a fixed value. Since the interval m and the width wi are both fixed values, they are stored in advance in the storage means (not shown) of the video game device 3. The interval m may be any suitable value depending on the environment in which the markers 8L and 8R are installed by the player. The interval between the installed markers 8L and 8R may be inputted by the player as the interval m, in which case the expression above can similarly be used as described above.

Then, the CPU 30 uses the width w and the viewing angle θ of the image sensing device 743 to calculate the distance d between the markers 8L and 8R and the image sensing device 743 (the controller 7) (step 83; see FIG. 16), and exits the subroutine. The CPU 30 calculates the distance d based on the following relationship.

$$\tan(\theta/2) = (w/2)/d = w/2d$$

In the expression, the viewing angle θ is a fixed value, and is therefore stored in advance in the storage means (not shown) in the video game device 3.

Referring back to FIG. 13, after calculating the distance d in step 62, the CPU 30 defines an effective range according to the distance d (step 63), and proceeds to step 64. As will later be more apparent, the effective range is defined by the length Lr, the front end position min and the rear end position max. For example, the CPU 30 defines an effective range so that the distance d obtained in step 62 coincides with the center of the effective range, the front end position min or the rear end position max.

In step 64, the CPU 30 calculates the direction data Db1 from the first position data Da1 to the second position data Da2. Specifically, the CPU 30 refers to the first position data Da1 and the second position data Da2 to calculate a vector extending from the first position data Da1 to the second position data Da2. Then, the CPU 30 stores the calculated vector data in the main memory 33 as the direction data Db1. Based on the difference between the direction data Db1 and a predetermined reference direction, it is possible to calculate the rotation about an axis extending in a direction perpendicular to the image-capturing surface of the controller 7.

The CPU 30 also calculates the middle point data Db2 representing the middle point between the first position data Da1 and the second position data Da2. Specifically, the CPU 30 refers to the first position data Da1 and the second position data Da2 to calculate the position (coordinates) of the middle point. Then, the CPU 30 stores the calculated middle point position data in the main memory 33 as the middle point data Db2. In the illustrated example, the middle point data Db2 represents the position of the target image (the markers 8L and 8R) in the captured image. Based on the difference between the middle point data Db2 and a predetermined reference position, it is possible to calculate the change in the image position caused by the change in the position of the controller 7.

Then, the CPU 30 uses the first position data Da1 and the second position data Da2 to calculate the distance d, and stores the distance d in the main memory 33 as the distance data Db3 (step 65). Then, the CPU 30 proceeds to the next step. The distance d is calculated in a similar manner to that described above with reference to FIGS. 14 and 16, and thus will not be further described below.

Then, the CPU 30 calculates the forward/backward position parameter r and re-defines the effective range (step 66), and proceeds to the next step. Referring now to FIGS. 15, 17A and 17B, the details of the process of calculating the forward/backward position parameter and re-defining the effective range will be described.

First, the effective range will be described. The effective range as used herein refers to a range defined for the position of the controller 7 with respect to a reference. A value based on the position of the controller 7 with respect to the effective range is given to the video game program and used in the game process. In the present embodiment, the distance d from the markers 8L and 8R to the tip of the controller 7 is used as the value representing the position of the controller 7. Therefore, the effective range is defined with respect to the distance d, with the lower limit of the effective range being 0 and the upper limit thereof being 1. A value between 0 to +1 according to the position of the controller 7 in the effective range is selected as the value according to the position of the controller 7. For example, the width of the effective range is determined to be a width across which the player can reasonably swing the controller 7 held in the player's hand without moving the feet, e.g., about 10 cm to about 40 cm. For example, where the width of the effective range is 30 cm and the distance between the markers 8L and 8R and the initial position of the controller 7 is 1 m 15 cm, the effective range is defined to be 1 m to 1 m 30 cm in terms of the distance from the markers 8L and 8R. Then, the value 0.5, representing the position at a distance of 1 m 15 cm, is used in the game process. While the effective range is defined in the illustrated example so that its center coincides with the position of the controller 7, the present invention is not limited thereto, and the effective range can be defined in any manner as long as the initial position of the controller 7 is included therein.

This will now be described in greater detail with reference to FIGS. 17A and 17B. First, FIG. 17A shows a case where a player U moves the controller 7 forward and backward with respect to the markers 8L and 8R. In FIG. 17A, "d" denotes the distance from the markers 8L and 8R to the controller 7, and "d1", "d2", "d3", "d4" and "d5" each denote the distance from the markers 8L and 8R to the tip of the controller 7. FIG. 17B shows a positional relationship between the effective range and the controller 7, and shows how to obtain the value (the forward/backward position parameter) r to be used in the game process in that position. In the figure, Lr is the width (length) of the effective range, min is the front end position (the distance from the markers 8L and 8R to the closest end of the effective range), and max is the rear end position (the distance from the markers 8L and 8R to the farthest end of the effective range), wherein Lr=max−min. In the present embodiment, the effective range is defined so that the forward/backward position parameter r is calculated to be 0 when the controller 7 (strictly speaking, the image sensing device 743) is located at the effective range front end position min. The forward/backward position parameter r is calculated to be 1 when the controller 7 is located at the effective range rear end position max. The forward/backward position parameter r is calculated to be a value between 0 and 1 according to the position of the controller 7 when the controller 7 is between the front end position min and the rear end position max of the effective range. When the player holding the controller 7 moves the controller 7 forward/backward beyond the effective range, the effective range is instantly moved so that the new position of the controller 7 is the front end position min or the rear end position max.

Specifically, where the controller 7 is at a distance d3 and the effective range is defined to extend from a distance d2 to a distance d5 as shown in state A of FIG. 17A, the value r corresponding to the distance d3 in the effective range where the distance d2 is 0 and the distance d5 is 1 is calculated to be ⅓ (0.33), for example. The value r is used in the game process. As the controller 7 is moved from the position at the distance d3 to the position at the distance d2 as shown in state B, the value r is calculated to be 0.33 to 0 according to the movement. As the controller 7 is further moved to the position at a distance d1 as shown in state C, the effective range is moved along with the movement of the controller 7, and the value r remains to be 0. Then, as the controller 7 is moved from the position at the distance d1 to the position at the distance d2 as shown in state D, the effective range remains unchanged, and the value r according to the position of the controller 7 in the effective range is calculated to be ⅓ (0.33), for example.

Referring to FIG. 15, the process of calculating the forward/backward position parameter r and re-defining the effective range will be described. Referring to FIG. 15, the CPU 30 determines whether or not the distance d calculated in step 65 is shorter than the front end position min (step 91), and whether or not the distance d is longer than the rear end position max (step 92). If the CPU 30 determines that the distance d is shorter than the front end position min (a transition from state B to state C in FIG. 17A), the process proceeds to step 93. If the CPU 30 determines that the distanced is longer than the rear end position max, the process proceeds to step 94. If the CPU 30 determines that the distance d is within the effective range (i.e., if the distance d is equal to or greater than the front end position min and equal to or less than the rear end position max) (state A or state D of FIG. 17A), the process proceeds to step 95 while the effective range remains unchanged.

In step 93, in response to the movement of the controller 7 to a position exceeding the effective range in the forward direction, the CPU 30 re-defines the effective range, and proceeds to step 95. Specifically, the CPU 30 updates the effective range front end position min to the current distance d and the rear end position max to the current distance d plus the length Lr, and stores the updated values in the main memory 33. In step 94, in response to the movement of the controller 7 to a position exceeding the effective range in the backward direction, the CPU 30 re-defines the effective range, and proceeds to step 95. Specifically, the CPU 30 updates the effective range rear end position max to the current distance d, and the front end position min to the current distance d minus the length Lr, and stores the updated values in the main memory 33. With the provision of steps 93 and 94, when the player moves the controller 7 forward/backward beyond the effective range, the effective range is instantly moved so that the new position of the controller 7 is the front end position min or the rear end position max.

In step 95, the CPU 30 calculates the forward/backward position parameter r according to the distance d and the effective range, and exits the subroutine. Specifically, the CPU 30 calculates (normalizes) the forward/backward position parameter r as follows.

$$r=(d-\min)/Lr$$

In step 95, the forward/backward position parameter r is calculated to be a value between 0 to 1 according to the effective range and the position of the controller 7.

Referring back to FIG. 13, after the process of calculating the forward/backward position parameter and re-defining the effective range in step 66, the CPU 30 sets the depth position data z according to the forward/backward position parameter r (step 67), and proceeds to the next step. The depth position data z is a value for calculating a coordinate in the depth direction in the game space, and is stored in the main memory 33 as the depth position data Dc4.

In a case where a player character P is moved by increasing/decreasing the z coordinate value in the camera coordinate system of the virtual camera in a game using a three-dimensional virtual space as shown in FIGS. 18 and 19, for example, the z coordinate value in the camera coordinate system is used as the depth position data z. A predetermined range is defined for the z coordinate, and the z coordinate value is determined so as to correspond to the value of the forward/backward position parameter r with respect to the defined range. With the x coordinate and the y coordinate, in addition to the z coordinate of the camera coordinate system, the position (coordinates) of the player character P in the world coordinate system is determined based on a predetermined conversion function, and the obtained position (coordinates) is stored in the main memory 33 as the object position data Dc2. The x coordinate and the y coordinate may be predetermined fixed values, or may be calculated from the control input through a process to be described later. In the example shown in FIG. 18, the x coordinate value and the y coordinate value are independent of the movement in the depth direction. Therefore, when the player character P is moved in the game space according to the depth position data z without changing the x coordinate value and the y coordinate value, the player character P moves in a direction parallel to the viewing direction of a virtual camera C. In the example shown in FIG. 19, the x coordinate value and the y coordinate value are changed according to the z coordinate value so that the player character P is displayed at the same position on the screen after a movement in the depth direction.

Where the axis direction of the camera coordinate system is the same as that of the world coordinate system, the z coordinate value in the world coordinate system may be used as the depth position data z throughout the entire process. A predetermined range is defined for the z coordinate, and the z coordinate value is determined so as to correspond to the value of the forward/backward position parameter r with respect to the defined range. Then, the depth position data z can be used as it is as the z component of the object position data Dc2, whereby there is no computational cost for coordinate conversion. Thus, if there is an axis extending in the movement direction, a coordinate component in the world coordinate system or the camera coordinate system may be used as the depth position data z.

If there is no axis extending in the movement direction, a predetermined parameter for the depth direction may be used as the depth position data z throughout the entire process. A predetermined range is defined in the world coordinate system extending in the movement direction including the depth direction component, with the depth position data z being defined as a parameter representing a position in the range, and the object position data Dc2 is calculated by a predetermined function. Therefore, in this case, the depth position data z may be the forward/backward position parameter r itself.

Then, the CPU 30 calculates the pointed position data (step 68), and exits the subroutine. The CPU 30 calculates the pointed position data Dc3 by using the direction data Db1 and the middle point data Db2 calculated in step 64, and stores the calculated data in the main memory 33.

For example, assume a case where the two markers 8L and 8R are installed on the upper surface of the monitor 2 (see FIG. 7), and the player points at the center of the screen of the monitor 2 using the controller 7 whose upper surface is facing up (where the center of the screen is being at the center of the image captured by the image capturing/processing section 74). Then, in the image captured by the image capturing/processing section 74, the middle point of the target image (the middle point between the markers 8L and 8R) does not coincide with the pointed position (the center of the screen). Specifically, the position of the target image in the captured image is shifted upward off the center of the captured image. If a reference position is set so that the center of the screen is pointed at when the target image is at such a position, the position of the target image in the captured image moves in response to the movement of the controller 7 (in the opposite direction to that of the movement of the controller 7). Therefore, it is possible to point at a position in the screen corresponding to the movement direction of the controller 7 by performing a process in which the pointed position in the screen is moved according to the movement of the position of the target image in the captured image. As to the reference position setting, the player may point at a predetermined position on the screen so that the position of the target image at that time is stored while being associated with a reference pointed position. Alternatively, the reference position may be a predetermined position if the positional relationship between the target image and the screen is fixed. The pointed position is calculated by using a function for calculating the coordinates of a position (the pointed position data Dc3) on the screen of the monitor 2 from the middle point data Db2. The function converts the middle point position (coordinates) calculated from a captured image to a position on the screen being pointed at by the controller 7 (pointed position) at the time when the image is captured. With this function, it is possible to calculate a pointed position on the screen from a middle point position. In order to convert a middle point position to a position in the game space, a position on the screen calculated by the above function can be further converted to a position in the game space corresponding to the position on the screen. The position in the game space corresponding to the position on the screen may be the position in the game space that is displayed at the position on the screen, the three-dimensional coordinate values in the game space determined by the pointed position data Dc3 and the depth position data Dc4, etc.

However, if the player points at the center of the screen of the monitor 2 using the controller 7 whose upper surface is not facing up (e.g., facing to the right), the position of the target image in the captured image is shifted off the center of the captured image in a direction other than the upward direction (e.g., to the left). Thus, due to a tile of the controller 7, the movement direction of the controller 7 does not coincide with the movement direction of the pointed position in the screen. In view of this, the middle point data Db2 is corrected based on the direction data Db1. Specifically, the middle point data Db2 calculated in step 64 is corrected to a middle point position that would be obtained if the upper surface of the controller 7 were facing up. More specifically, a direction data reference is also set in the reference position setting process, and the middle point data Db2 calculated in step 64 is corrected by rotating the position represented by the middle point data Db2 about the center of the captured image by an amount according to the angular difference between the direction data Db1 and the reference direction. Then, the pointed position data Dc3 is calculated using the corrected middle point data Db2.

An essential principle of the process of calculating the pointed position data Dc3 is to calculate the displacement of a two-dimensional position to be specified with respect to a predetermined reference position based on a change in the position of the target image in response to the movement of the controller 7. Therefore, the process of calculating the pointed position data Dc3 (step 66) can be used not only as a coordinate input corresponding to a position in the screen, but can be used widely as a two-dimensional coordinate input. For example, where the depth position data Dc4 is the z coordinate value in the world coordinate system as described above with reference to FIGS. 18 and 19, the pointed position data Dc3 can be used as the x coordinate value and the y coordinate value in the world coordinate system to thereby define a three-dimensional position. The pointed position data calculation process in that case may be performed by, irrespective of the screen, performing a calculation process of associating a movement of the target image with a movement of the x coordinate and the y coordinate in the world coordinate system from the reference position. The pointed position data calculation process does not have to be performed in a case where inputs other than that in the depth direction are not necessary, e.g., where the x coordinate value and the y coordinate value are predetermined fixed values.

Referring back to FIG. 12, after the process of calculating the control status information, the pointed position data and the depth position data in step 52, the CPU 30 defines a controlled object controlled with the controller 7 (step 53), and proceeds to the next step. The CPU 30 defines a controlled object for each of the control section 72, the image capturing/processing section 74, the acceleration sensor 701, etc., provided in the controller 7.

For example, a controlled object is updated as necessary in response to advancements in the game and the player's control operation. For example, a controlled object to be controlled based on a signal from the image capturing/processing section 74 provided in the controller 7, i.e., an object to be controlled based on values of the pointed position data Dc3, the depth position data Dc4, etc., may be the object present at a position in the virtual game world that is obtained by converting the pointed position or the depth position. There may be cases where other objects are controlled at the same time by using control means other than the signal from the image capturing/processing section 74. For example, the controlled object to be controlled by the cross-shaped key 72a provided on the controller 7 may be one of the objects in the virtual game world that are being displayed on the monitor 2.

In other examples, where it is not necessary to dynamically update a controlled object, the controlled object may be defined statically. For example, a controlled object to be controlled based on a signal from the image capturing/processing section 74 provided in the controller 7 may be statically defined to be a player character in the virtual game space, the virtual camera for displaying the virtual game space on the screen, or the like. Where the controlled object is defined statically, it does not have to be defined repeatedly for each iteration of a loop, in which case step 53 may be performed only at the initialization process of the game process.

Then, the CPU 30 performs an operation for a controlled object (step 54). In step 54, the CPU 30 updates the orientation data Dc1 and the object position data Dc2 of the controlled object defined in step 53. For example, three-dimensional coordinates are calculated based on the pointed position data Dc3 and the depth position data Dc4, and the object position data Dc2 is updated with the calculated coordinates. Where the position values except for the depth value are statically defined, the three-dimensional coordinates may be calculated from the defined values and the depth position data Dc4. Where the controlled object of the image capturing/processing section 74 provided in the controller 7 is a player character, an object in the game space or a virtual camera, the player character, the object or the virtual camera is moved to the position represented by the object position data Dc2. The orientation data Dc1 is calculated and updated as necessary in response to the movement. Where the controlled object is the virtual camera, the orientation data Dc1 of the virtual camera may be updated so that the position represented by the object position data Dc2 is the point of sight. Also with objects to be controlled by control means other than the image capturing/processing section 74, a process is performed based on a control operation.

Then, the CPU 30 performs a display process (step 56), and proceeds to the next step. The CPU 30 produces a game image referring to the controlled object information Dc and other data necessary for producing the game image (e.g., data representing the image and the position of the player character, and the terrain data) which are stored in the main memory 33. Specifically, the CPU 30 produces an image of an object whose position and orientation have been updated in step 54, or an image of the virtual space as viewed from a virtual camera whose position and orientation have been updated. Then, the CPU 30 displays the produced image on the screen of the monitor 2.

Then, the CPU 30 determines whether or not to end the game (step 57). For example, the game is ended when a game-over condition is met (e.g., when the parameter representing the player character's remaining physical strength becomes 0) or when the player manually ends the game. If the game is not to be ended, the CPU 30 returns to step 51 to repeat the process. If the game is to be ended, the CPU 30 exits the process shown in the flow chart.

Thus, by capturing the image of fixedly-installed markers (infrared light from the two markers 8L and 8R in the illustrated example) with the image capturing/processing section 74 of the controller 7, it is possible to realize a novel control device capable of a three-dimensional input operation of specifying not only the position of the controller 7 in the up/down direction and the left/right direction with respect to the markers, but also the distance between the markers and the controller 7. While the range for the input of the distance between the markers and the controller 7 may extend over quite a large distance, an appropriate effective range is defined depending on the player's current operating position, thereby allowing for an appropriate input suitable for the game process while following changes in the distance. Since the effective range is moved according to the player's current operating position, the player can get a similar operation feel no matter where the player operates the controller 7, thus increasing the freedom of the position at which the player performs a control operation. In the present embodiment, when the controller 7 is moved forward/backward beyond the effective range, the effective range is moved instantly according to the position of the controller 7. Therefore, the present embodiment is suitable for a game process in which there should be a high sensitivity to the distance between the controller 7 and the markers.

Second Embodiment

A video game system according to a second embodiment will now be described. The video game system of the second embodiment is similar to that of the first embodiment in terms of the system configuration and the operation, except for the process of calculating the forward/backward position parameter r and re-defining the effective range (see step 66 of FIG. 13). Therefore, in the following description of the second embodiment, like elements/steps to those of the first embodiment will be denoted by like reference numerals/step numbers, and will not be further described.

Figure 20:
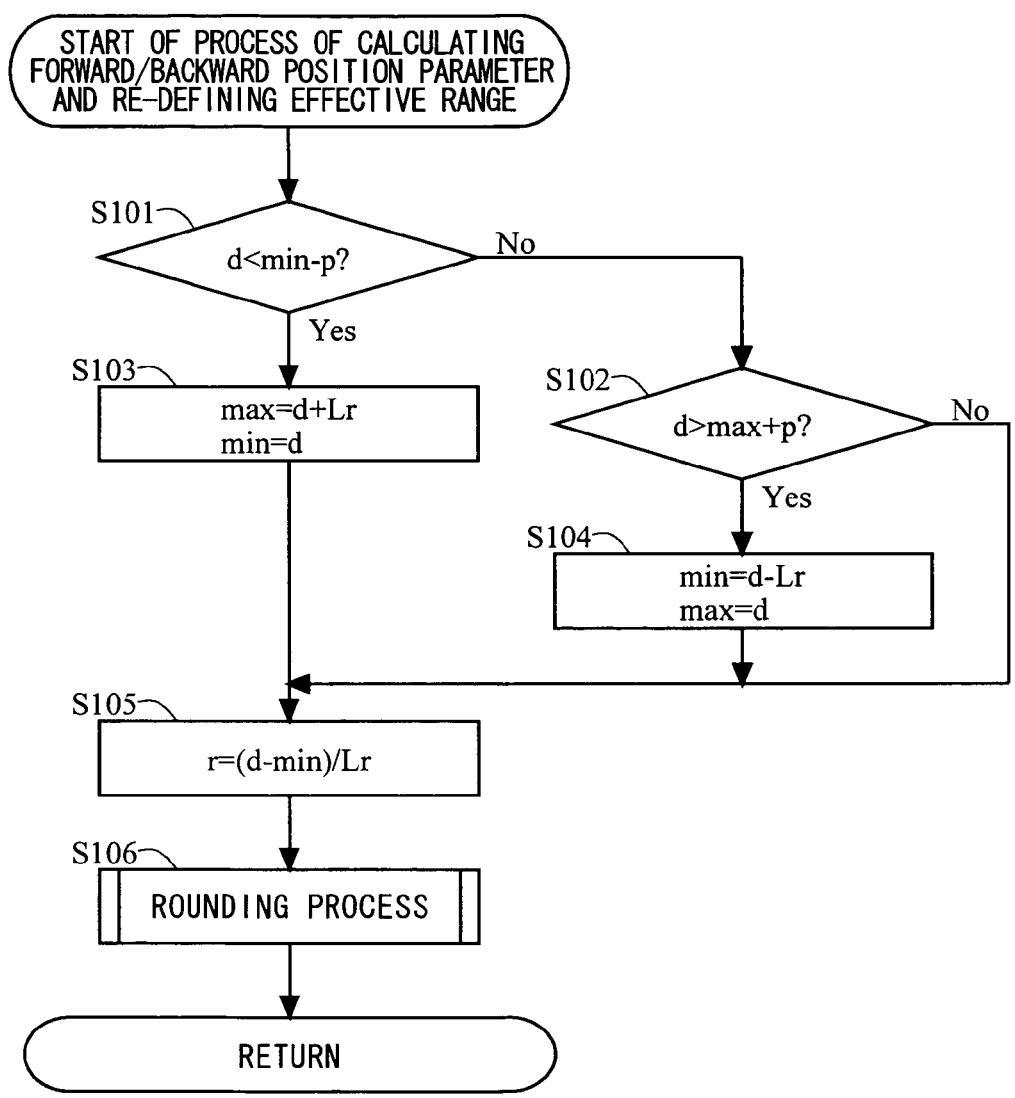
FIG. 20 shows, in detail, a subroutine for the process of calculating the forward/backward position parameter and re-defining the effective range according to a second embodiment.
Figure 22A:
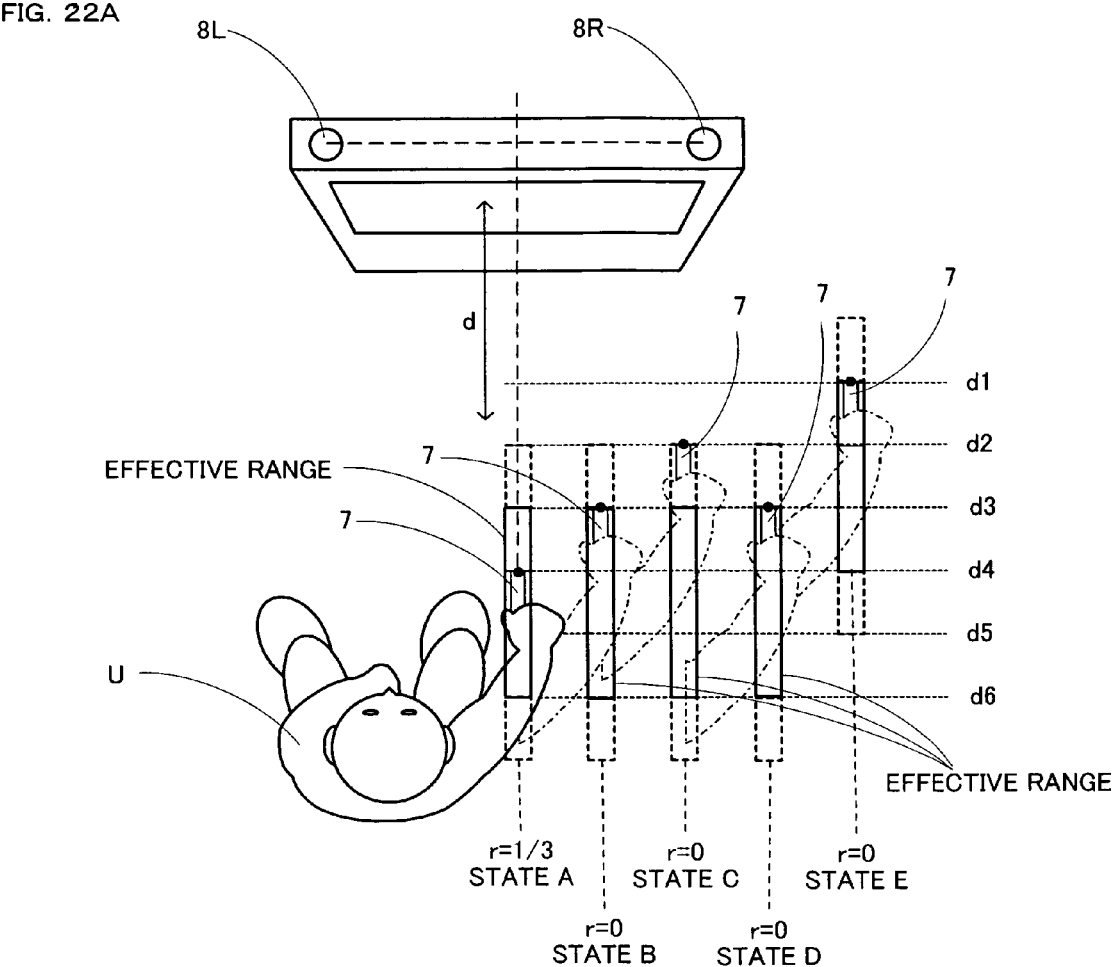
FIGS. 22A and 22B show the operation of calculating the forward/backward position parameter r and defining the effective range according to the subroutine shown in FIG. 20.
Figure 22B:
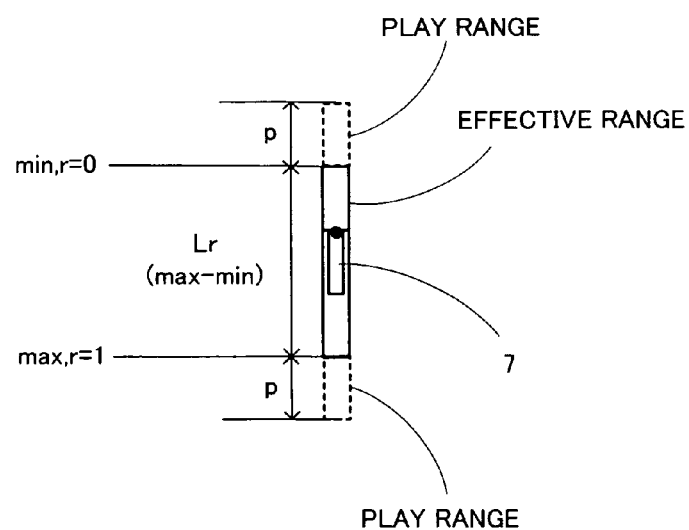

Referring to FIGS. 20 to 22B, the process of calculating the forward/backward position parameter and re-defining the effective range of the second embodiment will now be described in detail. FIG. 20 shows, in detail, a subroutine for the process of calculating the forward/backward position parameter and re-defining the effective range according to the present embodiment. FIG. 21 shows, in detail, a subroutine of step 106 in FIG. 20 for the rounding process. FIGS. 22A and 22B show the operation of calculating the forward/backward position parameter r and defining the effective range according to the subroutine shown in FIG. 20.

Referring to FIGS. 22A and 22B, the effective range used in the second embodiment will first be described. As in the first embodiment, the effective range is a range defined for obtaining the forward/backward position parameter r used in the game process in response to a player's operation in which the player holding the controller 7 moves the controller 7 toward or away from the markers 8L and 8R, i.e., an operation such that the distance d is changed. Therefore, in the process of the present embodiment, the value used as the position of the controller 7 is specifically the value of the distance d at that time. The effective range is a range with respect to the distance d, wherein Lr is the length of the effective range, min is the front end position (the distance from the markers 8L and 8R to the closest end of the effective range), and max is the rear end position (the distance from the markers 8L and 8R to the farthest end of the effective range) Thus, Lr=max−min.

The effective range is defined so that the forward/backward position parameter r is calculated to be 0 when the controller 7 (strictly speaking, the image sensing device 743) is located at the effective range front end position min (e.g., state B of FIG. 22A). The forward/backward position parameter r is calculated to be 1 when the controller 7 is located at the effective range rear end position max. The forward/backward position parameter r is calculated to be a value between 0 and 1 according to the position of the controller 7 when the controller 7 is between the front end position min and the rear end position max of the effective range (e.g., state A of FIG. 22A).

In the present embodiment, a play range having a length of p is provided at both ends of the effective range. The effective range is not moved even when the controller 7 is moved beyond the effective range if the controller 7 is within the play range, which is provided at both ends of the effective range to be continuous with the effective range. The play range is defined so that the forward/backward position parameter r is calculated to be 0 when the controller 7 is located in the play range at the front end of the effective range (e.g., state C of FIG. 22A). The forward/backward position parameter r is calculated to be 1 when the controller 7 is located in the play range at the rear end of the effective range. Thus, when the player holding the controller 7 moves the controller 7 into a play range at the front or rear end of the effective range, the forward/backward position parameter r is calculated to be equal to the front end position min or the rear end position max, whichever is being the boundary between the play range and the effective range.

Even though the controller 7 being within a play range means that the controller 7 has been moved forward/backward beyond the effective range, the effective range will not be moved as long as the controller 7 is located within the effective range or the play range (e.g., a transition from state C to state D in FIG. 22A). When the player holding the controller 7 moves the controller 7 to a position beyond the play range, the effective range is moved instantly so that the new position of the controller 7 is the front end position min or the rear end position max (e.g., a transition from state C to state E in FIG. 22A).

Referring to FIG. 20, the process of calculating the forward/backward position parameter r and re-defining the effective range will be described. Referring to FIG. 20, the CPU 30 determines whether or not the distance d calculated in step 65 (see FIG. 13) is shorter than the front end position min minus p (step 101; whether or not the controller 7 is beyond the end of the front-side play range) and whether or not the distance d is longer than the rear end position max plus p (step 102; whether or not the controller 7 is beyond the end of the rear-side play range). If the CPU 30 determines that the distance d is shorter than the front end position min minus p (a transition from state C to state E in FIG. 22A), the process proceeds to step 103. If the CPU 30 determines that the distance d is longer than the rear end position max plus p, the process proceeds to step 104. If the CPU 30 determines that the distance d is within the effective range or the play range (i.e., if the distance d is equal to or greater than the front end position min minus p and equal to or less than the rear end position max plus p) (state A to state D of FIG. 22A), the process proceeds to step 105 while the effective range remains unchanged.

In step 103, in response to the movement of the controller 7 beyond the front-side play range, the CPU 30 re-defines the effective range, and proceeds to step 105. Specifically, the CPU 30 updates the effective range front end position min to the current distance d and the rear end position max to the current distance d plus the length Lr, and stores the updated values in the main memory 33. In step 104, in response to the movement of the controller 7 beyond the rear-side play range, the CPU 30 re-defines the effective range, and proceeds to step 105. Specifically, the CPU 30 updates the effective range rear end position max to the current distance d, and the front end position min to the current distance d minus the length Lr, and stores the updated values in the main memory 33. With the provision of steps 103 and 104, when the player moves the controller 7 forward/backward beyond the play range, the effective range is instantly moved so that the new position of the controller 7 is the front end position min or the rear end position max.

In step 105, the CPU 30 calculates the forward/backward position parameter r according to the distance d and the effective range. Then, the CPU 30 performs a process of rounding the calculated value of the forward/backward position parameter r (step 106), and exits the subroutine. Specifically, in step 105, the CPU 30 calculates the forward/backward position parameter r as follows.

$$r=(d-\min)/Lr$$

Then, in the process of step 106, the forward/backward position parameter r is rounded to a number between 0 and 1 according to the position of the controller 7 with respect to the effective range and the play range.

The rounding process will be described with reference to FIG. 21. The CPU 30 determines whether or not the calculated forward/backward position parameter r is smaller than 0 (step 111) and whether or not the calculated forward/backward position parameter r is larger than 1 (step 112). If the forward/backward position parameter r is smaller than 0, the CPU 30 sets the forward/backward position parameter r to 0 (step 113), and exits the subroutine. If the forward/backward position parameter r is larger than 1, the CPU 30 sets the forward/backward position parameter r to 1 (step 114), and exits the subroutine. If the forward/backward position parameter r is greater than or equal to 0 and less than or equal to 1, the CPU 30 exits the subroutine without changing the value r.

Thus, also in the second embodiment, while the range for the input of the distance between the markers and the controller 7 may extend over quite a large distance, an appropriate effective range is defined depending on the current operating position, thereby allowing for an appropriate input suitable for the game process while following changes in the distance. Since the effective range is moved according to the player's current operating position, the player can get a similar operation feel no matter where the player operates the controller 7. With the provision of the play range at both ends of the effective range, it is possible to realize an operation feel different from that of the first embodiment. For example, in the first embodiment, when the controller 7 is moved forward/backward beyond the effective range, the effective range is instantly moved according to the new position of the controller 7. Thus, the position of the effective range is sensitive to the distance between the controller 7 and the markers. In the second embodiment, with the provision of the play range at both ends of the effective range, there is provided a margin for the movement of the effective range. Specifically, the player may possibly move the controller 7 over a greater distance than intended, which may result in the controller 7 being moved beyond the effective range even though the player does not intend to change the operating position. Even in such a case, the effective range is not moved as long as the controller 7 is within the play range in the second embodiment, whereby it is possible to make a distance input with some margin by using the half-fixed effective range.

Third Embodiment

A video game system according to a third embodiment will now be described. The video game system of the third embodiment is similar to that of the first embodiment in terms of the system configuration and the operation, except for the process of calculating the forward/backward position parameter r and re-defining the effective range (see step 66 of FIG. 13). Therefore, in the following description of the third embodiment, like elements/steps to those of the first embodiment will be denoted by like reference numerals/step numbers, and will not be further described.

Figure 23:
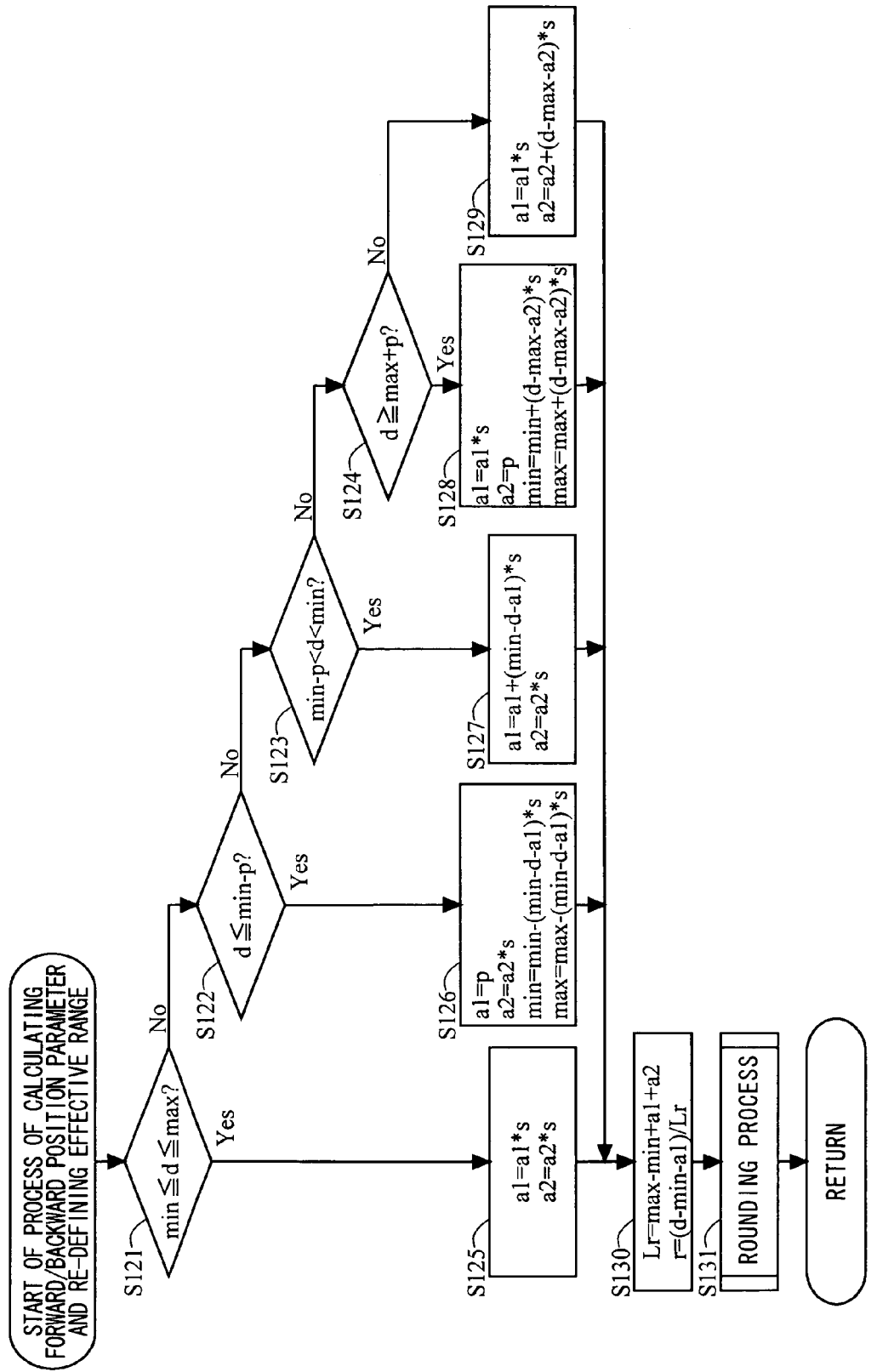
FIG. 23 shows, in detail, a subroutine for the process of calculating the forward/backward position parameter and re-defining the effective range according to a third embodiment.
Figure 24A:
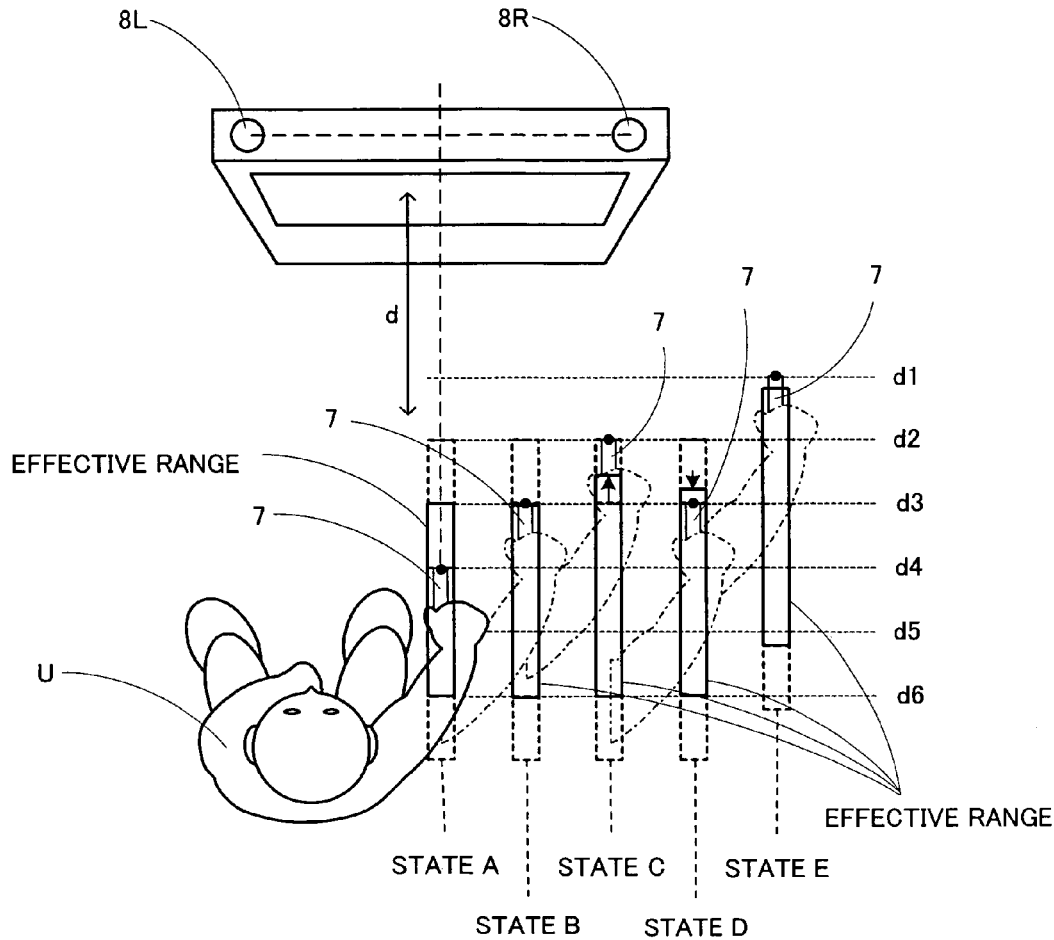
FIGS. 24A and 24B show the operation of calculating the forward/backward position parameter r and defining the effective range according to the subroutine shown in FIG. 23.
Figure 24B:
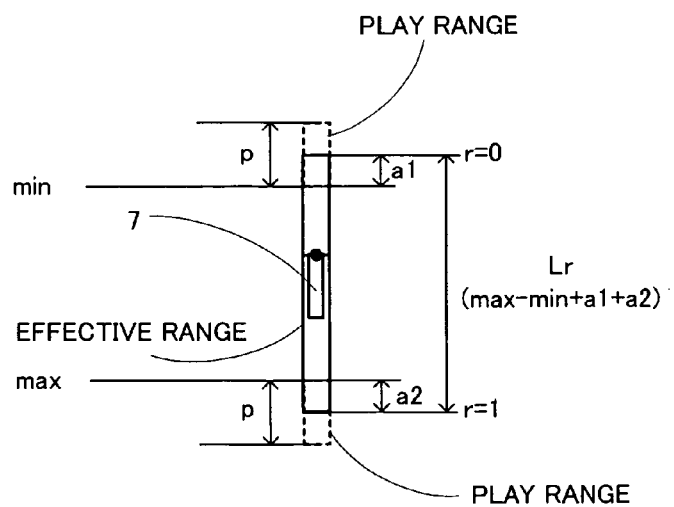

Referring to FIGS. 23 to 24B, the process of calculating the forward/backward position parameter and re-defining the effective range of the third embodiment will now be described in detail. FIG. 23 shows, in detail, a subroutine for the process of calculating the forward/backward position parameter and re-defining the effective range according to the present embodiment. FIGS. 24A and 24B show the operation of calculating the forward/backward position parameter r and defining the effective range according to the subroutine shown in FIG. 23.

Referring to FIGS. 24A and 24B, the effective range used in the third embodiment will first be described. As in the first embodiment, the effective range is a range defined for obtaining the forward/backward position parameter r used in the game process in response to a player's operation in which the player holding the controller 7 moves the controller 7 toward or away from the markers 8L and 8R, i.e., an operation such that the distance d is changed. Therefore, in the process of the present embodiment, the value used as the position of the controller 7 is specifically the value of the distance d at that time, and the effective range is a range with respect to the distance d. In the present embodiment, the effective range can be extended by a1 in the forward direction and by a2 in the backward direction. The extension lengths a1 and a2 are variables, based on which the effective range is extended/shrunk. Where a1=0 and a2=0, the effective range is not extended, whereby the front end position of the un-extended effective range (the distance from the markers 8L and 8R to the closest end of the effective range) is min, and the rear end position thereof (the distance from the markers 8L and 8R to the farthest end of the effective range) is max. Specifically, the front end position is defined as min−a1, the rear end position as max+a2, and the length Lr of the effective range as max−min+a1+a2.

The effective range is defined so that the forward/backward position parameter r is calculated to be 0 when the controller 7 (strictly speaking, the image sensing device 743) is located at the un-extended effective range front end position min minus a1 (e.g., state B of FIG. 24A). The forward/backward position parameter r is calculated to be 1 when the controller 7 is located at the un-extended effective range rear end position max plus a2. The forward/backward position parameter r is calculated to be a value between 0 and 1 according to the position of the controller 7 when the controller 7 is between the front end position min minus a1 and the rear end position max plus a2 of the un-extended effective range (e.g., state A of FIG. 24A).

In the present embodiment, a play range having a length of p is provided at both ends, as shown in FIG. 24B. The effective range is not moved (as will later be more apparent, the effective range may be extended/shrunk) even when the controller 7 is moved beyond the area between min and max if the controller 7 is within the play range, which is provided next to min and max to be continuous with the effective range.

When the controller 7 is located within the play range, the extension length a1 or a2 is increased/decreased to extend/shrink the effective range so that the boundary of the effective range approaches the position of the controller 7 at a predetermined rate. When the controller 7 is within the play range and is outside the effective range, the extension length a1 or a2 is increased to extend the effective range (e.g., as indicated by an arrow shown in state C of FIG. 24A). When the controller 7 is within the play range and within the effective range, the extension length a1 or a2 is decreased to shrink the effective range (e.g., as indicated by an arrow shown in state D of FIG. 24A). When the controller 7 is located between min and max, the extension length a1 or a2 is decreased to shrink the effective range so that the boundary of the effective range approaches min and max at a predetermined rate. When the player holding the controller 7 moves the controller 7 beyond the play range, the extension length a1 or a2 is equal to the length of the play range, and the entire effective range is moved so that the boundary of the effective range approaches the position of the controller 7 at a predetermined rate (e.g., state E of FIG. 24A). Then, the controller 7 is located outside the effective range and outside the play range, and the value of the forward/backward position parameter r is adjusted by a process similar to the rounding process so that the value is 0 when the controller 7 is on the front side of the effective range and the play range and the value is 1 when the controller 7 is on the rear side of the effective range and the play range. While one end of the effective range is extending/shrinking, the other end thereof extends/shrinks independently of the first end unless the effective range itself is being moved (state A to state D of FIG. 24A).

Referring now to FIG. 23, the process of calculating the forward/backward position parameter r and re-defining the effective range will be described. Referring to FIG. 23, the CPU 30 determines whether or not the distance d calculated in step 65 (see FIG. 13) is greater than or equal to mm and less than or equal to max (step 121), whether or not the distance d is less than or equal to mm-p (step 122; whether or not the controller 7 is beyond the end of the front-side play range), whether or not the distance d is longer than mm-p and shorter than mm (step 123), and whether or not the distance d is greater than or equal to max+p (step 124; whether or not the controller 7 is beyond the end of the rear-side play range). If the distance d is greater than or equal to min and less than or equal to max (state A of FIG. 24A), the CPU 30 proceeds to step 125. If the distance d is less than or equal to min−p (state L of FIG. 24A), the CPU 30 proceeds to step 126. If the distance d is longer than mm-p and shorter than mm (state C and state D of FIG. 24A), the CPU 30 proceeds to step 127. If the distance d is greater than or equal to max+p, the CPU 30 proceeds to step 128. If the distance d shorter than max+p and longer than max, the CPU 30 proceeds to step 129.

In step 125, in response to the controller 7 being located between min and max, the CPU 30 re-defines the effective range by shrinking it to its original length, and proceeds to step 130. Specifically, the CPU 30 updates the extension length a1 to a1×s (s is a constant satisfying 0<s<=1; the effective range instantly goes back to the original length if s=1) and the extension length a2 to a2×s, and stores the updated values in the main memory 33. In step 126, in response to the movement of the controller 7 beyond the front-side play range, the CPU 30 re-defines the effective range, and proceeds to step 130. Specifically, the CPU 30 updates the extension length a1 to the length p of the play range, the extension length a2 to a2×s, the value min to min−(min−d−a1)×s, and the value max to max−(min−d−a1)×s, and stores the updated values in the main memory 33. In step 127, in response to the movement of the controller 7 into the front-side play range, the CPU 30 re-defines the effective range, and proceeds to step 130. Specifically, the CPU 30 updates the extension length a1 to a1+(min−d−a1)×s and the extension length a2 to a2×s, and stores the updated values in the main memory 33. In step 128, in response to the movement of the controller 7 beyond the rear-side play range, the CPU 30 re-defines the effective range, and proceeds to step 130. Specifically, the CPU 30 updates the extension length a1 to a1×s, the extension length a2 to the length p of the play range, the value max to max+(d−max−a2)×s and the value min to min+(d−max−a2)×s, and stores the updated values in the main memory 33. In step 129, in response to the movement of the controller 7 into the rear-side play range, the CPU 30 re-defines the effective range, and proceeds to step 130. Specifically, the CPU 30 updates the extension length a1 to a1×s and the extension length a2 to a2+(d−max−a2)×s, and stores the updated values in the main memory 33. With the provision of steps 125 to 129, the effective range is extended/shrunk and moved at a predetermined speed according to the new position of the controller 7.

In step 130, the CPU 30 calculates the forward/backward position parameter r according to the distance d and the effective range. Then, the CPU 30 performs a process of rounding the calculated value of the forward/backward position parameter r (step 131), and exits the subroutine. Specifically, in step 130, the CPU 30 calculates the length Lr as follows $$Lr=\max-\min+a1+a2$$

and calculates the forward/backward position parameter r as follows.

$$r=(d-\min-a1)/Lr$$

In step 131, the forward/backward position parameter r is rounded to a number between 0 and 1 according to the position of the controller 7 with respect to the effective range and the play range. The rounding process of step 131 is similar to that of the second embodiment as described above with reference to FIG. 21, and will not be further described below.

Thus, also in the third embodiment, while the range for the input of the distance between the markers and the controller 7 may extend over quite a large distance, an appropriate effective range is defined depending on the current operating position, thereby allowing for an appropriate input suitable for the game process while following changes in the distance. Since the effective range is moved according to the player's current operating position, the player can get a similar operation feel no matter where the player operates the controller 7. With the provision of the play range at both ends of the effective range, and with the effective range being extended/shrunk at a predetermined rate and moved at a predetermined rate, it is possible to realize an operation feel different from that of the first or second embodiment. For example, in the first and second embodiments, when the controller 7 is moved forward/backward beyond the effective range or beyond the play range, the effective range is instantly moved according to the new position of the controller 7. Thus, the position of the effective range is sensitive to the distance between the controller 7 and the markers. In the third embodiment, with the provision of the play range at both ends of the effective range and with the effective range being extended/shrunk or moved gradually, the effective range reacts even more slowly to a player's input. Even if the player unintentionally makes an abrupt, erroneous movement, thereby moving the controller 7 forward/backward beyond the effective range, the effective range will be following the operating position only gradually. Therefore, the influence of the erroneous operation can be absorbed to some extent. If the player changes the position of the controller 7 intending to move the effective range, the effective range is moved appropriately. Thus, it is possible to realize a more stable input operation.

While the effective range is defined so that it is possible to make an input specifying the distance between the markers and the controller 7 by capturing the image of fixedly-installed markers with the image capturing/processing section 74 of the controller 7, it may alternatively be defined so that a position in other directions can be specified based on the captured image. For example, in order to specify the position of the controller 7 with respect to the markers in the left/right direction or that in the up/down direction (e.g., the pointed position data Dc3), an effective range may be defined to extend in each of these directions. Then, a left/right or up/down position parameter can be calculated based on the positional relationship between the position of the controller 7 in the left/right direction or the up/down direction and the effective range. It is possible to define an effective range for making an input specifying a position in other directions by moving or extending/shrinking the effective range according to the position of the controller 7 in the left/right direction or the up/down direction, as with the distance direction as described above.

This variation can be realized in the form of a video game program as follows. The video game program is a video game program executed by a computer (30) of a video game device (3) for performing a game process by obtaining, as control data (Da), data (Da1, Da2) from a game controller (7) including an image-capturing section (74) for capturing an image of an imaging target (8), the data (Da1, Da2) being either the captured image itself from the image-capturing section or data obtained by performing a predetermined operation on the captured image. The video game program instructs the computer to perform a position detection step, an effective range defining step, a position data calculation step, a game process step and a display process step. The position detection step uses the control data obtained from the game controller to detect at least one of the position of the game controller with respect to the imaging target in the up/down direction and that in the left/right direction, based on the position of the imaging target in the captured image. The effective range defining step defines an effective range having a predetermined length along at least one of the up/down direction and the left/right direction with respect to the game controller. The position data calculation step calculates position data regarding the position in at least one of the up/down direction and the left/right direction, according to the position of the game controller with respect to the effective range. The game process step performs a predetermined game process on the virtual game world based on the position data calculated in the position data calculation step. The display process step displays, on a display device, an image of the virtual game world after the game process. The video game program may instruct the computer to further perform an effective range re-defining step. When the position of the game controller goes beyond the effective range, the effective range re-defining step re-defines the effective range by moving the effective range according to the new position of the game controller.

While the forward/backward position parameter r is converted to the depth position data z in the game process described above, the forward/backward position parameter r may be used in various types of game processes. In an alternative game process, the forward/backward position parameter r may be converted to the speed of an object in the virtual game world, such as a vehicle. In another game process, the forward/backward position parameter r may be used as a parameter for an action (e.g., throwing a punch) executed by a player character in the virtual game world. In another game process, the forward/backward position parameter r may be converted to the zoom factor of the virtual camera. In another game process, at least one threshold value may be set for the forward/backward position parameter r so as to provide a switch that is turned ON/OFF based on the value r with respect to the threshold value (e.g., a predetermined action of a player character may be triggered based on the value r with respect to the threshold value).

While the distance d is calculated by analyzing the image data obtained by the image sensing device 743 in the above description, the present invention can be carried out with any other suitable means as long as the distance d to a predetermined measured target placed in a real space can be determined, whereby an effective range can be defined for the distance d. The means for determining the distance d may be, for example, those using an ultrasonic sensor, a magnetic sensor, etc. It is possible to make a control input, without determining the actual distance d between the image sensing device 743 and the imaging target, as long as it is possible to obtain a value associated with the distance. Therefore, without determining the distance d, the process can be performed by using data provided in advance and associated with the length between the markers 8L and 8R in the captured image.

While the controller 7 and the video game device 3 are connected to each other via wireless communications in the above description, the controller 7 and the video game device 3 may be electrically connected to each other via a cable. In such a case, a cable connected to the controller 7 is connected to a connection terminal of the video game device 3.

While the receiver unit 6 connected to the connection terminal of the video game device 3 is used as receiver means for receiving transmit data wirelessly transmitted from the controller 7 in the above description, the receiver means may alternatively be a receiver module provided inside the video game device 3. In such a case, the transmit data received by the receiver module is outputted to the CPU 30 via a predetermined bus.

In the above description, the image data captured by the image sensing device 743 is analyzed, whereby the position of infrared light from the markers 8L and 8R, the centroid thereof, etc., are produced in the controller 7 as process result data, and the produced process result data is transmitted to the video game device 3. Alternatively, data at any other suitable process step may be transmitted from the controller 7 to the video game device 3. For example, the image data captured by the image sensing device 743 may be transmitted from the controller 7 to the video game device 3, wherein the CPU 30 performs the analysis process to obtain the process result data. In such a case, there is no need for the image processing circuit 744 provided in the controller 7. Alternatively, data at a certain point during the process of analyzing the image data may be transmitted from the controller 7 to the video game device 3. For example, data obtained from the image data representing luminance, position, area, etc., may be transmitted from the controller 7 to the video game device 3, wherein the CPU 30 performs the rest of the analysis process to obtain the process result data.

While infrared light from the two markers 8L and 8R are used as imaging targets to be captured by the image capturing/processing section 74 of the controller 7 in the above description, any other suitable object may be used as the imaging target. For example, only one marker or three or more markers may be provided around the monitor 2, and the infrared light from these markers may be used as imaging targets to be captured by the image capturing/processing section 74. For example, one marker having a predetermined length may be provided around the monitor 2, wherein the present invention can be carried out as described above by using the length of the marker as the interval m (see FIG. 16). Alternatively, the display screen of the monitor 2 itself or other light-emitting objects (e.g., lighting in the room) may be used as the imaging target to be captured by the image capturing/processing section 74. Any of various light-emitting objects may be used as the imaging target to be captured by the image capturing/processing section 74, by calculating the position of the controller 7 with respect to the display screen based on the positional relationship between the imaging target and the display screen of the monitor 2.

The shape of the controller 7, and the shape, number and arrangement of the control sections 72 provided on the controller 7, are all illustrative, and it is understood that the present invention can be carried out with any other suitable shape, number and arrangement. The position of the image capturing/processing section 74 in the controller 7 (the light receiving port of the image capturing/processing section 74) does not have to be the front side of the housing 71, but may be on any other side as long as light can be received from outside the housing 71.

While the distance d is used as the value representing the position of the controller 7 in the real space in the first to third embodiments, the three-dimensional position in the real space where the controller 7 may be detected, as well as the distance d, and the three-dimensional position may be used in the process of determining the position of the controlled object.

In such a case, for example, a process similar to that of the first to third embodiments may be performed for effective ranges defined for the various components of the three-dimensional coordinate system, thereby determining the three-dimensional coordinates in the virtual space.

Alternatively, two predetermined three-dimensional positions may be set in a three-dimensional coordinate system as two boundaries, and the effective range may be defined as an area extending between the two boundaries, thereby performing a process based on the position of the controller 7 in the three-dimensional area. For example, the effective range may be a rectangular parallelepiped defined with the first point and the second point being opposing apexes. In such a case, each edge of the rectangular parallelepiped may be parallel to an axis of the coordinate system. A rectangular parallelepiped model may be provided in advance, whereby the effective range can be defined only by adjusting the size of the rectangular parallelepiped model so that the first point and the second point are included therein.

The position of the controller 7 in the real space may be calculated as follows, for example. If the orientation of the controller 7 can be known based on the acceleration data Da4, it is possible to calculate the three-dimensional position with respect to the positions of the markers 8R and 8L based on the first position data Da1 and the second position data Da2.

The position of the controller 7 in the real space may be calculated by, for example, measuring the position by using an ultrasonic sensor, a magnetic sensor, etc.

The target to be moved in the real space for making the control input does not have to be the controller 7 including the image capturing/processing section 74. For example, a data input device including an image capturing device may be fixedly installed at a predetermined position, and the position of a target that does not output data, e.g., a hand of the player, may be detected by the image capturing device, thereby outputting the position data from the data input device.

The storage medium storing a virtual position determining program of the example embodiment presented herein is useful, for example, as a video game system and a video game program of a video game in which a player holds and operates a physically-separate controller unit, and by which it is possible to realize a control operation with a high degree of freedom.

While the example embodiment has been described in detail, the foregoing description is in all aspects illustrative and not restrictive. It is understood that numerous other modifications and variations can be devised without departing from the scope of the example embodiment.

What is claimed is:

1. A storage medium storing a virtual position determining program for instructing a computer to perform a process on a virtual space based on input information obtained from an input device operated by a user, the input information including target data that changes according to a change in a position of a predetermined target in a real space, the program instructing the computer to perform:
    actual position data calculation for calculating actual position data representing a position of the target in the real space by using the target data;
    effective range defining for defining an effective range as a range extending from a first boundary to a second boundary, wherein the first boundary is represented by first position data and the second boundary is represented by second position data;
    effective range position data calculation for calculating effective range position data representing a position of a value of the actual position data in the effective range;
    position determining for determining a position of a controlled object in the virtual space through an operation based on a value of the effective range position data; and
    a display process for displaying the virtual space on a display device, wherein
    said input device is a controller which is held in a hand of the user and receives instructions from the user and outputs control signals so that the computer performs the process on the virtual space, wherein the virtual position determining program instructs the computer to further perform effective range updating for, when the value of the actual position data is outside the effective range, updating the effective range by moving the first boundary and the second boundary so that the value of the actual position data is included in the effective range.

2. The storage medium storing a virtual position determining program according to claim 1, wherein the virtual position determining program instructs the computer to further perform effective range updating for, when the value of the actual position data is outside the effective range, updating the effective range by moving the first boundary and the second boundary so that one of the first boundary and the second boundary that is closer to the value of the actual position data becomes equal to the value of the actual position data.

3. The storage medium storing a virtual position determining program according to claim 1, wherein the virtual position determining program instructs the computer to further perform second effective range updating for, when the value of the actual position data is outside the effective range, updating the effective range by moving the first boundary and the second boundary so that one of the first boundary and the second boundary that is closer to the value of the actual position data approaches the value of the actual position data at a predetermined rate.

4. The storage medium storing a virtual position determining program according to claim 1, wherein the effective range position data calculation calculates the effective range position data so that the effective range position data takes a maximum value when the value of the actual position data is equal to the first boundary and the effective range position data takes a minimum value when the value of the actual position data is equal to the second boundary.

5. The storage medium storing a virtual position determining program according to claim 1, wherein:
    the effective range defining includes further defining a play range having a predetermined length at a front end of the effective range and a rear end thereof and
    the virtual position determining program instructs the computer to further perform effective range updating for, when the actual position data takes a value outside a combined range including the effective range and the play ranges, updating the effective range by moving the values of the first boundary and the second boundary so that one of the first boundary and the second boundary that is closer to the value of the actual position data becomes equal to the value of the actual position data.

6. The storage medium storing a virtual position determining program according to claim 5, wherein the effective range position data calculation includes calculating the effective range position data so that the effective range position data takes a maximum value when the value of the actual position data is equal to the first position data or exceeds the effective range in a direction of the first position data, and the effective range position data takes a minimum value when the value of the actual position data is equal to the second position data or exceeds the effective range in a direction of the second position data.

7. The storage medium storing a virtual position determining program according to claim 1, wherein:
    the effective range defining defines the second position data on a first side of the first position data, third position data on a second side of the first position data, and fourth position data on the first side of the second position data; and
    the effective range defining defines an upper limit boundary as position data variable from the first position data to the third position data and a lower limit boundary as position data variable from the second position data to the fourth position data, and defining the effective range as a range between the variable upper limit boundary and the variable lower limit boundary; and
    the virtual position determining program instructs the computer to further perform:
    when the value of the actual position data is within the variable range of the upper limit boundary/lower limit boundary, updating the upper limit boundary/lower limit boundary so that the upper limit boundary/lower limit boundary approaches the value of the actual position data at a predetermined rate, and updating the lower limit boundary/upper limit boundary so that the lower limit boundary/upper limit boundary approaches the second position data/first position data at a predetermined rate;
    when the value of the actual position data is within a range between the first position data and the second position data, updating the upper limit boundary/lower limit boundary so that the upper limit boundary/lower limit boundary approaches the first position data/second position data at a predetermined rate;
    when the value of the actual position data is further on the second side of the third position data, moving the first position data, the second position data, the third position data, the fourth position data and the lower limit boundary so that a value of the third position data approaches the value of the actual position data at a predetermined rate and updating the upper limit boundary to the new second position data; and when the value of the actual position data is further on the first side of the fourth position data, moving the first position data, the second position data, the third position data, the fourth position data and the upper limit boundary so that a value of the fourth position data approaches the value of the actual position data at a predetermined rate and updating the lower limit boundary to the new fourth position data.

8. The storage medium storing a virtual position determining program according to claim 7, wherein the effective range position data calculation includes calculating the effective range position data so that the effective range position data takes a minimum value when the value of the actual position data is equal to the first position data or exceeds the effective range in a direction forward of the first position data, and the effective range position data takes a maximum value when the value of the actual position data is equal to the second position data or exceeds the effective range in a direction backward of the second position data.

9. A storage medium storing a virtual position determining program for, based on data from an input device operated by a user including position information of a target in a real space, calculating a position of the target obtained when representing the real space in a predetermined coordinate system, and calculating a virtual position of a virtual object in a virtual space based on the calculated position, the virtual position determining program instructs a computer to function as:

effective range defining programmed logic circuitry for defining an effective range, which is defined by at least a first position and a second position in a predetermined coordinate system of the real space;

normalization programmed logic circuitry for, when the position of the target is included in the effective range, normalizing the position of the target and calculating a value corresponding to the position of the target obtained when the normalization is performed; and calculation programmed logic circuitry for calculating the virtual position based on the value calculated by the normalization programmed logic circuitry, wherein said input device is a controller which is held in a hand of the user and receives instructions from the user and outputs control signals so that the computer performs a process on the virtual space, wherein the virtual position determining program instructs the computer to further function as effective range moving programmed logic circuitry for, when the position of the target is not included in the effective range, updating the first position and the second position to move the effective range to a position that includes the position of the target.

* * * * *